(12) United States Patent
Yoshida et al.

(10) Patent No.: US 8,445,835 B2
(45) Date of Patent: May 21, 2013

(54) ENCODER, SERVO UNIT AND ENCODER MANUFACTURING METHOD

(75) Inventors: Yasushi Yoshida, Fukuoka (JP); Shirou Yoshidomi, Fukuoka (JP); Jiro Muraoka, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 368 days.

(21) Appl. No.: 13/008,915

(22) Filed: Jan. 19, 2011

(65) Prior Publication Data

US 2011/0298411 A1 Dec. 8, 2011

(30) Foreign Application Priority Data

Jun. 7, 2010 (JP) ................................. 2010-129613

(51) Int. Cl.
*G01D 5/34* (2006.01)

(52) U.S. Cl.
USPC .................................................. 250/231.13

(58) Field of Classification Search
USPC ....................................... 250/231.13–231.18
See application file for complete search history.

(56) References Cited

U.S. PATENT DOCUMENTS

| 5,017,776 | A | * | 5/1991 | Loewen ................... 250/231.14 |
| 5,537,210 | A | | 7/1996 | Kaneda et al. |
| 5,559,600 | A | | 9/1996 | Mitchell |

FOREIGN PATENT DOCUMENTS

| JP | 06-347293 | 12/1994 |
| JP | 07-218237 | 8/1995 |
| JP | 3509830 B2 | 5/1997 |
| JP | 2006-078178 | 3/2006 |

OTHER PUBLICATIONS

Japanese Office Action for corresponding JP Application No. 2010-129613, Jun. 26, 2012.

* cited by examiner

*Primary Examiner* — Thanh Luu
(74) *Attorney, Agent, or Firm* — Ditthavong Mori & Steiner, P.C.

(57) ABSTRACT

An encoder includes a disk including a first track and a second track each being ring-shaped and provided with a rotary grating, and a first detector and a second detector that are fixedly disposed so as to respectively face the first track and the second track each provided with a fixed grating that detects diffracted interfering light. A plurality of slits of the first track are formed as curved slits. The first detector facing the first track is disposed at a position where a tangent of each of the slits included in the diffraction grating of the first track becomes parallel to a tangent of each of the slits included in the diffraction grating of the second track at a position where the second detector faces the second track.

10 Claims, 14 Drawing Sheets

ENCODER, SERVO UNIT AND ENCODER MANUFACTURING METHOD

CROSS-REFERENCE TO RELATED APPLICATIONS

The present application claims priority under 35 U.S.C. §119 to Japanese Patent Application No. 2010-129613, filed Jun. 7, 2010. The contents of this application are incorporated herein by reference in their entirety.

BACKGROUND OF THE INVENTION

1. Field of the Invention

The present invention relates to an encoder, a servo unit and an encoder manufacturing method.

2. Description of the Related Art

Encoders are used for measuring the physical quantity, such as the position and the velocity, of a moving object.

The encoders can generally be classified into the rotary encoder and the linear encoder, based on the moving direction of the moving object.

The encoder is also referred to as a rotary position detection device, and detects the position (angle), velocity (rotary velocity) and the like of a moving object (rotary object). On the other hand, the linear encoder is also referred to as a linear position detection device, and detects the position, velocity and the like of a moving object.

The encoders can generally be classified into the incremental encoder and the absolute encoder, based on, e.g., the position detection method. The incremental encoder chiefly detects the relative position of a moving object with reference to the origin position. Specifically, the incremental encoder previously detects the origin position, obtains a periodic signal such as a pulse signal commensurate with the amount of shift from the origin position, and subject the periodic signal to processing such as counting, to thereby detect the position and the like. The absolute encoder is also referred to as the absolute value encoder, and detects the absolute position of a moving object.

The encoders, of a non-contact type, can generally be classified into the "magnetic encoder (including resolvers)" and the "optical encoder", based on the principle of detection and the like. The magnetic encoder is characterized in its being superior to the optical encoder in the environmental resistance performance, for example. The optical encoder is characterized in its being superior to the magnetic encoder in the position resolution performance, for example. Also developed is an encoder which uses both the magnetism and light so as to exploit the characteristics of both of them (also referred to as the "hybrid encoder").

Of those various encoders noted above, an encoder of appropriate type is selectively used so as to meet the required characteristic for the intended use. In particular, the encoder plays an important role in grasping the actual position and the like for, e.g., a servo motor that controls the position, the velocity and the like. In other words, the performance, characteristic and the like of a particular encoder selectively used for a servo motor may govern the performance, characteristic and the like of the servo motor.

SUMMARY OF THE INVENTION

Means for Solving the Problem

According to an aspect of the present invention, there is provided an encoder, including:

a circular disk that is disposed rotatably about a rotary axis and that has a first track and a second track each being ring-shaped and provided with an optical rotary grating; and a first detector and a second detector that are fixedly disposed so as to respectively face the first track and the second track each provided with an optical fixed grating that structures a diffraction interference optical system in conjunction with the facing rotary grating of corresponding one of the first track and the second track to detect diffracted interfering light obtained by the rotary grating and the fixed grating, wherein the rotary grating of the first track includes a plurality of slits formed as curved slits each curved from a radial direction, and the first detector facing the first track is disposed so as to face the first track at a position where a tangent of each of the slits included in the rotary grating of the first track becomes parallel to a tangent of each of the slits included in the rotary grating of the second track at a position where the second detector faces the second track.

According to another aspect of the present invention, there is provided a servo unit, including:

a motor that rotates a shaft;

an encoder that is coupled to the shaft to measure a position of the shaft; and a controller that controls rotation of the motor based on the position detected by the encoder, wherein the encoder includes a circular disk that is disposed about a rotary axis so as to be rotatable in accordance with rotation of the shaft and that has a first track and a second track each being ring-shaped and provided with an optical rotary grating, and a first detector and a second detector that are fixedly disposed so as to respectively face the first track and the second track each provided with an optical fixed grating that structures a diffraction interference optical system in conjunction with the facing rotary grating of corresponding one of the first track and the second track to detect diffracted interfering light obtained by the rotary grating and the fixed grating, wherein the rotary grating of the first track includes a plurality of slits formed as curved slits each curved from a radial direction, and the first detector facing the first track is disposed so as to face the first track at a position where a tangent of each of the slits included in the rotary grating of the first track becomes parallel to a tangent of each of the slits included in the rotary grating of the second track at a position where the second detector faces the second track.

According to still another aspect of the present invention, there is provided an encoder manufacturing method, including:

determining number of a plurality of slits formed in a rotary grating formed for each of a ring-shaped first track and a ring-shaped second track provided to a circular disk disposed about a rotary axis so as to be rotatable when mounted on an encoder, such that a detection signal of a prescribed period is obtained based on the plurality of slits of each of the first track and the second track;

setting a plurality of radial lines originating from the rotary axis equiangularly for the first track as many as the number of the slits determined in the determining the number of a plurality of slits;

setting a plurality of curved lines by curving each of the plurality of radial lines in a circumferential direction with a prescribed curvature for the first track, such that a pitch of the plurality of slits assumes a prescribed value;

setting the plurality of slits of the first track along the plurality of curved lines; and fixedly disposing a first detector and a second detector so as to respectively face the first track and the second track, each of the first detector and the second detector being provided with an optical fixed grating that structures a diffraction interference optical system in conjunction with the rotary grating of corresponding one of the first track and the second track to detect diffracted interfering light obtained by the rotary grating and the fixed grating, wherein in the fixedly disposing the first detector and the second detector, the first detector is disposed so as to face the first track at a position where a tangent of each of the slits included in the rotary grating of the first track becomes parallel to a tangent of each of the slits included in the rotary grating of the second track at a position where the second detector faces the second track.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
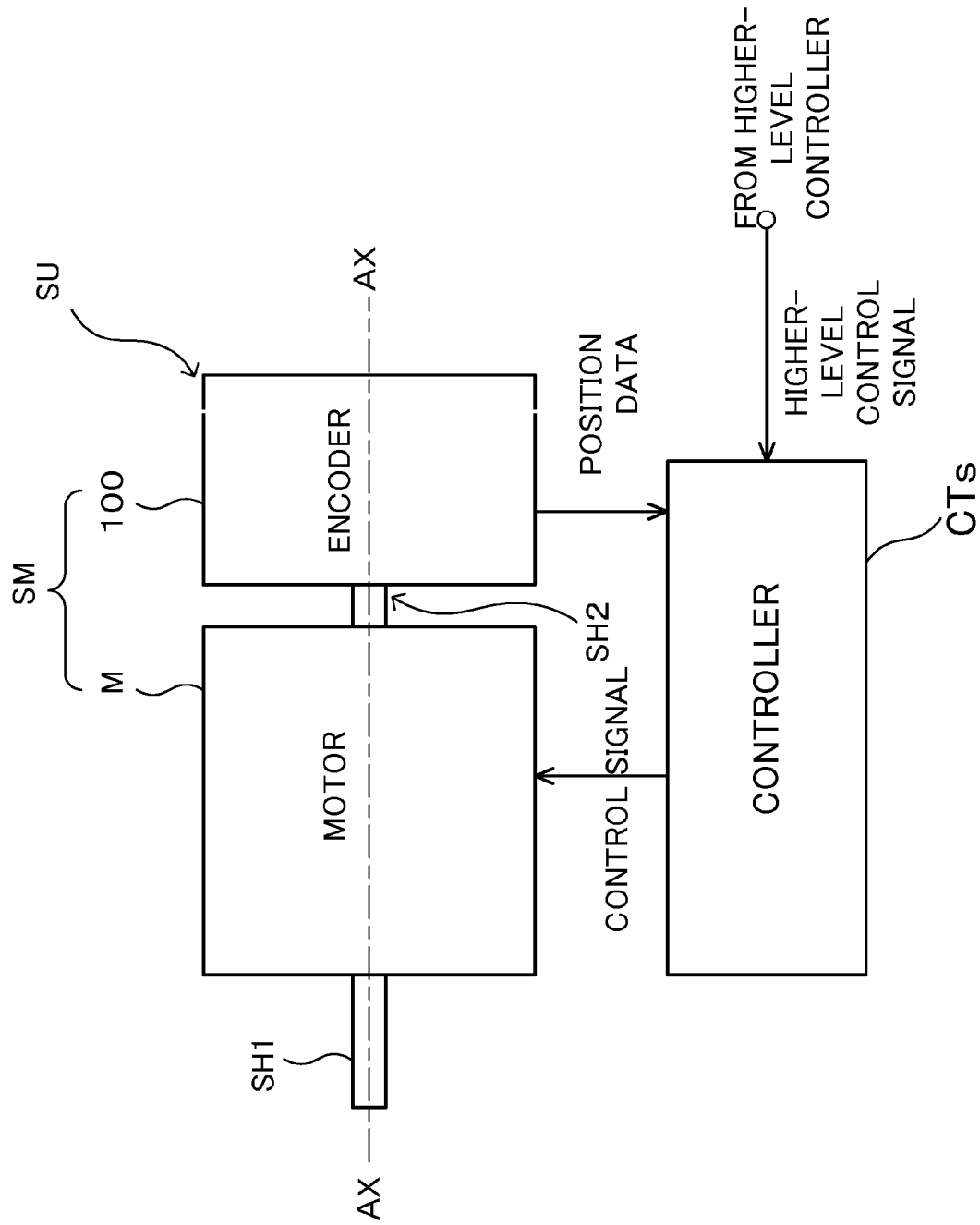
FIG. 1 is an explanatory diagram for describing the structure of a servo unit according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In the embodiment of the present invention whose description will be given in the following, for ease of explanation, the description will proceed taking up a servo unit including an encoder as an example. That is, the encoder according to the embodiment is applied to a servo motor, to detect the rotary angle θ (absolute position) of the servo motor as a position x. It is to be noted that, the position detection target of the encoder according to the embodiment described herein is not limited to the servo motor, and the encoder according to the embodiment is applicable to any of a variety of rotary objects (moving objects) that rotates about a certain rotary axis, such as a prime mover and a steering wheel.

The description of the embodiment of the present invention will proceed in the following order for ease of understanding.
<0. Related Technique>
<1. First Embodiment>
(1-1. Servo Unit according to First embodiment)
(1-2. Encoder according to First Embodiment)
(1-2-1. Disk 110)
(Tracks TA to TC)
(Shape of Slits SL)
(Magnet MG)
(1-2-2. Detector 130X, Detectors 130A to 130C)
(1X Detection Mechanism)
(Optical Detection Mechanism)
(1-2-3. Structure of Curved Slits)
(Curved Slits within One Track T)
(Positional Relationship between Curved Slits and Slits on Fixed Grating Side)
(Relationship among Curved Slits Included in Different Types of Tracks)
(1-2-4. Position Data Generator 140)
(1-3. Operation of Servo Unit according to First Embodiment)
(1-4. Manufacturing Method of Encoder according to First Embodiment)
(1-5. Exemplary Effect Achieved by Encoder System of First Embodiment)
(1-6. Example of Encoder according to First Embodiment)

0. Related Technique

Before giving the description of the encoder and the like according to the embodiment of the present invention, optical encoders according to techniques related to the present invention will be described.

What has been developed as one of the optical encoders according to the related technique is the one using any grating(s) formed by a plurality of slits (including the reflective type and the transmissive type). The encoder using the optical grating can generally be classified into the geometrical optics encoder which uses light simply transmitting through or reflected off the grating, and the diffraction interference optics encoder which uses diffracted interfering light obtained by a plurality of gratings.

The geometrical optics encoder receives light reflected off or transmitting through the slits forming the grating without being influenced by diffraction and interference, and specifies the positional change and the like based on the counts of the light reception and the like. The geometrical optics encoder has a characteristic that its detection precision tends to be impaired by a greater distance between one grating and other grating, a light receiver or the like (hereinafter also referred to as the "gap g"), when the slit intervals in the one grating (hereinafter also referred to as the "pitch p") is constant.

On the other hand, the diffraction interference optics encoder uses diffracted interfering light obtained by a plurality of gratings, and specifies a positional change and the like based on, e.g., the counts of the reception of the diffracted interfering light. Accordingly, the diffraction interference optics encoder is capable of improving the S/N ratio (Signal to Noise ratio) than the geometrical optics encoder can. Furthermore, the diffraction interference optics encoder has an additional characteristic that its detection precision is less likely to be affected even when a relatively great value is set as the gap g, which means, possible mechanical interference between the constituents is reduced, which in turn makes it possible to improve the environmental resistance performance against shock or the like. Thus, the diffraction interference optics encoder is more advantageous in many aspects than the geometrical optics encoder.

On the other hand, with the diffraction interference optics encoder, because it is necessary to structure diffraction interference optical systems, the pitch p for each of a plurality of gratings (diffraction gratings) and the gap g being the interval of the gratings are set to appropriate values. Such a relationship between the pitch p and the gap g becomes a limitation imposed on the development and manufacture of the encoder itself. That is, deviation of the pitch p or the gap g from the appropriate value impairs the quality of the diffracted interfering light, which eventually impairs the S/N ratio of the periodic signals to be detected. Additionally, in order to maintain the appropriate value of the pitch p or the gap g, it is necessary to design and develop the diffraction interference optical systems taking into consideration of, in addition to the pitch p and the gap g, the periodicity (which varies in accordance with the number of the slits) of the periodic signals, the formation position of the slits and the like.

Therefore, designing and development cannot be carried out with ease because of the reduced flexibility. Similarly, the manufacture cannot be carried out with ease because adjustment must be carried out for each of the diffraction interference optical systems. Further, such a limitation imposed on the designing and development makes it difficult to miniaturize the device itself.

Such limitations imposed on the designing, development and manufacture may hold true for a case where one diffraction interference optical system solely is used for obtaining one periodic signal. However, particularly when a plurality of diffraction interference optical systems are used for obtaining a plurality of periodic signals, e.g., as in a case of the absolute encoder, the designing, development and manufacture must be carried out for each of the diffraction interference optical systems. Therefore, the limitations on such procedures are influential to a greater extent.

In contrast to the related techniques described above, the encoder according to the embodiment of the present invention whose description will be given in the following makes it possible to carry out the manufacture and other procedures with ease and achieve miniaturization, while using diffracted interfering light to thereby improve the resolution. In the following, the embodiment of the present invention will be detailed.

1. First Embodiment

1-1. Servo Unit According to First Embodiment

First, with reference to FIG. 1, a description will be given of the structure of a servo unit according to a first embodiment of the present invention. FIG. 1 is an explanatory diagram for describing the structure of the servo unit according to the first embodiment of the present invention.

As shown in FIG. 1, a servo unit SU according to the present embodiment includes a servo motor SM and a controller CT. The servo motor SM includes an encoder 100 and a motor M.

The motor M is an exemplary motive power source that does not include the encoder 100. The motor M singly may be referred to as a servo motor in some cases; whereas in the present embodiment, a structure including the encoder 100 is referred to as the servo motor SM. The motor M has a shaft SH1 on at least one side thereof, which shaft SH1 is rotated about a rotary axis AX, to produce torque.

It is to be noted that the motor M is not particularly limited, so long as it is a motor that is controlled based on position data. Further, the motor M is not limited to be an electrically driven motor which is powered by electricity. For example, it may be a motor powered by other motive power source, such as a hydraulic motor, a pneumatic motor, or a steam motor. On the other hand, for ease of explanation, the following discusses a case where the motor M is an electrically driven motor.

The encoder 100 is disposed on the side opposite to the shaft SH1 relative to the motor M, and is coupled to other shaft SH2 that rotates in association with the shaft SH1. The encoder 100 detects the position of the shaft SH2, to thereby detect the position x of the shaft SH1 producing the torque (which may also be referred to as a rotary angle $\theta$, a position x of the motor M or the like), and outputs position data representing the position x.

The encoder 100 may detect, in addition to or in place of the position x of the motor M, at least one of the velocity v of the shaft SH1 (which may also be referred to as a rotary velocity, an angular velocity, a velocity v of the motor M or the like) and an acceleration a of the shaft SH1 (which may also be referred to as a rotary acceleration, an angular acceleration, an acceleration a of the motor M or the like). In this case, the velocity v and the acceleration a of the motor M can be detected by, for example, differentiating the position x with respect to time once or twice, or by counting periodic signals, whose description will be given later, at prescribed intervals. For ease of explanation, the following description is given based on the premise that the physical quantity detected by the encoder 100 is the position x.

Where to dispose the encoder 100 is not particularly limited to the exemplary position shown in the present embodiment. For example, the encoder 100 may be disposed so as to be directly coupled to the shaft SH1, or it may be coupled to any moving object such as the shaft SH1 via other mechanism such as a speed reducer, a rotation direction converter.

The controller CT obtains the position data from the encoder 100, and controls the rotation of the motor M based on the received position data. Accordingly, in the present embodiment in which an electrically driven motor is employed as the motor M, the controller CT controls current, voltage or the like applied to the motor M based on the position data, to thereby control the rotation of the motor M. Another possible manner of control that the controller CT exerts is to obtain a higher-level control signal from a higher-level controller (not-shown), to control the motor M such that the shaft SH1 of the motor M produces the position, velocity or the like represented by the higher-level control signal. It is to be noted that, in a case where the motor M is the one powered by other motive power source, e.g., a hydraulic, pneumatic, or steam motor, the controller CT is capable of controlling the rotation of the motor M by controlling the supply from such a particular motive power source.

1-2. Encoder According to First Embodiment

Figure 2:
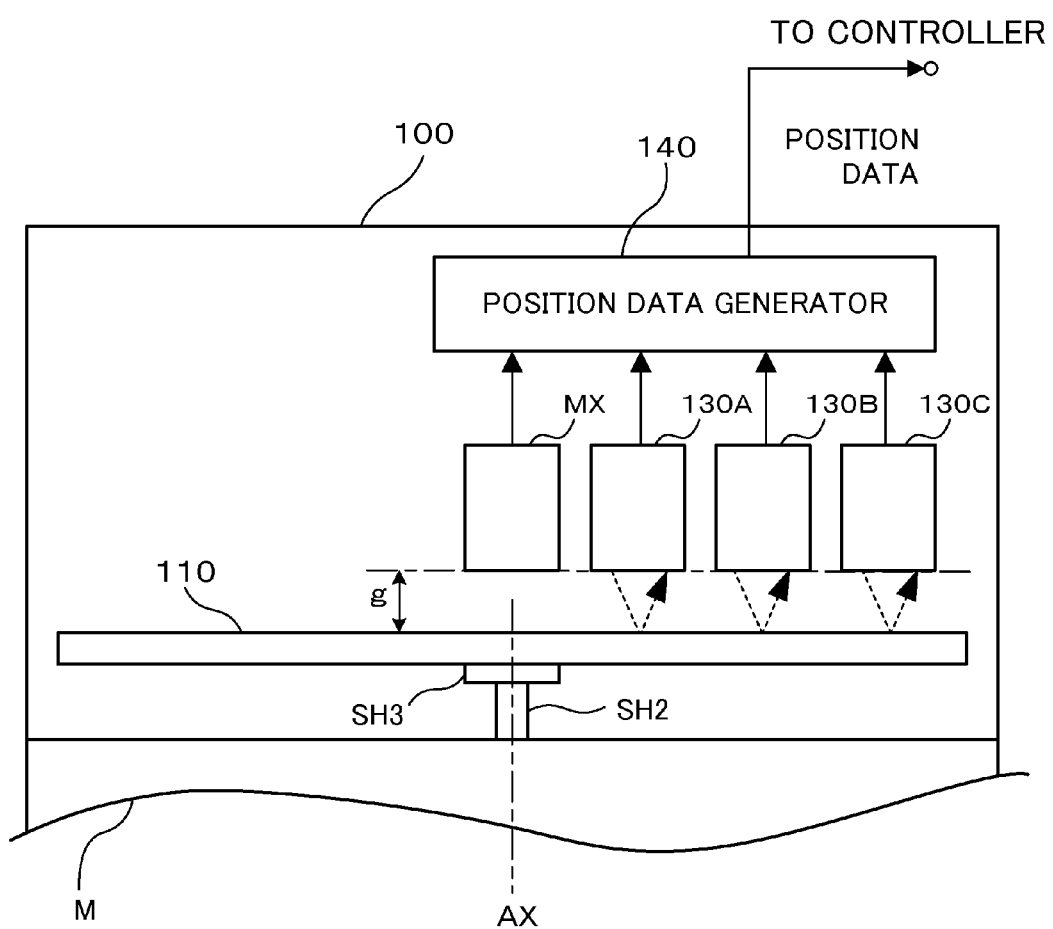
FIG. 2 is an explanatory diagram for describing the structure of an encoder according to the first embodiment of the present invention.
Figure 3:
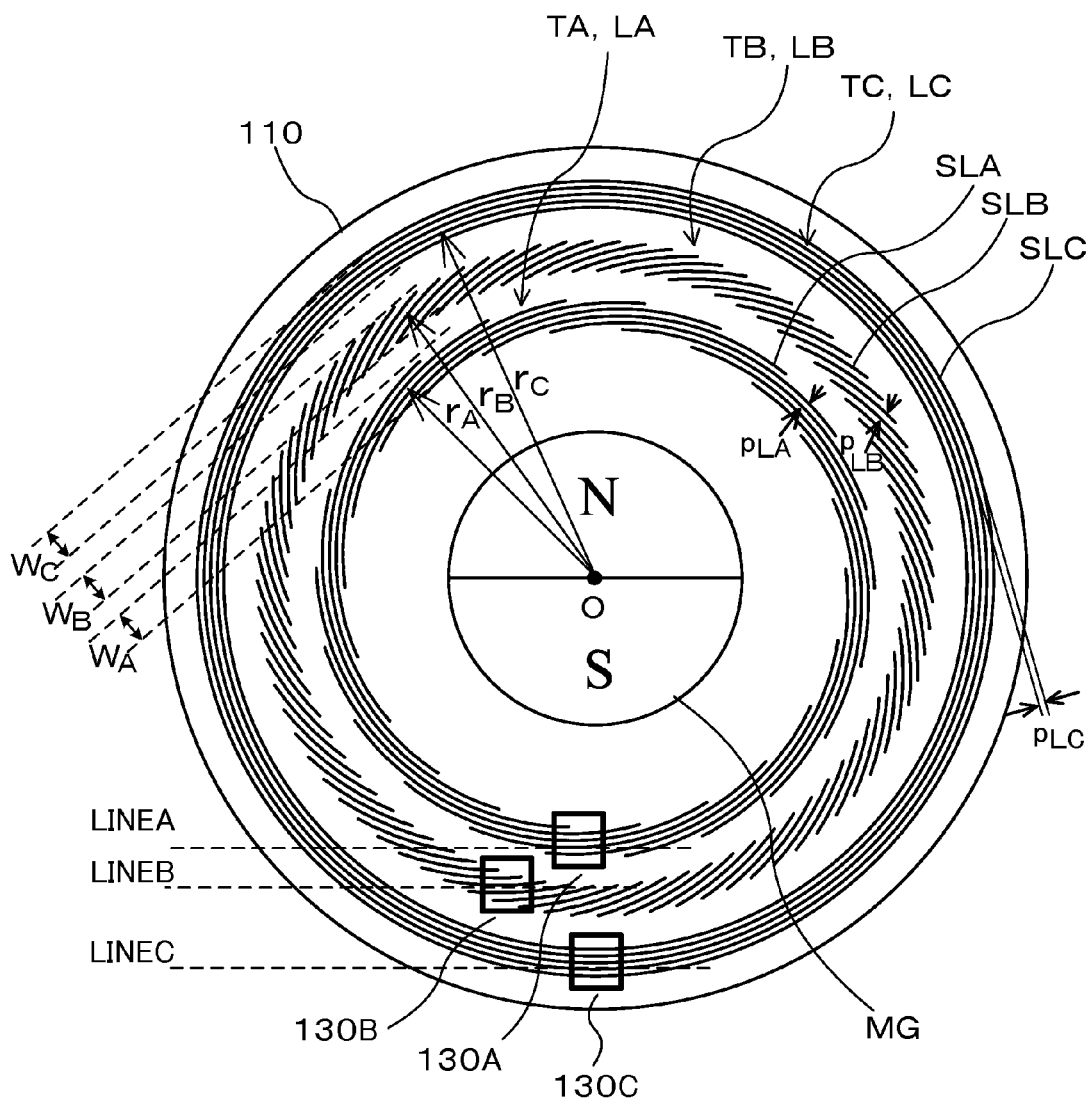
FIG. 3 is an explanatory diagram for describing a disk included in the encoder according to the first embodiment of the present invention.

Next, with reference to FIGS. 2 and 3, a description will be given of the structure of the encoder 100 according to the present embodiment. FIG. 2 is an explanatory diagram for describing the structure of the encoder according to the present embodiment. FIG. 3 is an explanatory diagram for describing a disk included in the encoder according to the present embodiment.

As shown in FIG. 2, the encoder 100 according to the present embodiment includes a shaft SH3, a disk 110, detectors 130X, 130A to 130C, and a position data generator 140.

(1-2-1. Disk 110)

As shown in FIG. 3, the disk 110 is formed in a circular shape, having a disk center O arranged so as to substantially agree with the rotary axis AX. The disk 110 is coupled, via the shaft SH3 being rotatable about the rotary axis AX, to the shaft SH2 associated with the shaft SH1 of the motor M. Consequently, the disk 110 is disposed so as to be rotatable about the rotary axis AX in accordance with the rotation of the motor M.

As shown in FIG. 3, the disk 110 includes tracks TA to TC and a magnet MG.

The description of the present embodiment proceeds taking up the encoder 100 of the absolute type as an example. Therefore, the disk 110 includes three tracks TA to TC for precisely detecting an absolute position x in the rotation of the motor M. It is to be noted that the number of the tracks T is not limited to three, and any plurality of numbers may be set as appropriate so as to meet the required detection precision or signal processing for the purpose of detecting the absolute position x. Further, when the embodiment of the present invention is to be applied to the encoder 100 of the incremental type, at least one track T will suffice, provided that curved slits are included. The description of the curved slits will be given later.

(Tracks TA to TC)

The tracks TA to TC are arranged each in a ring-like manner about the disk center O of the disk 110, respectively being set to have prescribed widths of $w_A$ to $w_C$. In the present embodiment, the widths $w_A$ to $w_C$ of the tracks TA to TC are set to assume an identical value of width w ($w=w_A=w_B=w_C$). Note that the track widths $w_A$ to $w_C$ may assume different values from one another.

The tracks TA to TC are arranged at different radial positions (track radii $r_A$ to $r_C$) with reference to the center of each width w. That is, the tracks TA to TC are formed concentrically about the disk center O, and are arranged in order of the tracks TA, TB and TC from the disk center O toward the outer circumference ($r_A<r_B<r_C$).

As shown in FIG. 3, optical rotary gratings LA to LC (rotating optical diffraction gratings) are formed in the tracks TA to TC, respectively.

The rotary gratings LA to LC include a plurality of optical slits SLA to SLC, respectively. Thus, the rotary gratings LA to LC each in conjunction with corresponding one of the optical slits SLA to SLC structure a part of an independent and individual diffraction interference optical system.

The slits SLA to SLC are each formed to reflect light (i.e., as reflective slits) or to transmit light (i.e., as transmissive slits).

In a case where the slits SL are to be formed as the reflective slits, they may be formed through deposition of a substance having high reflectivity, for example. On the other hand, the sites in the disk 110 other than the slits SLA to SLC may be formed by disposing a light-absorbing substance through deposition or the like; alternatively, they may be formed by using the disk 110 which itself is made of a light-transmissive substance. Another possible manner is to use the disk 110 which itself is made of a light-reflective substance, and to process the sites other than the slits SLA to SLC by etching or the like. Still another possible manner is to form the slits SLA to SLC and the sites other than the slits SLA to SLC both which are made of a material exhibiting high reflectivity, and to provide the slits SLA to SLC and the sites other than the slits SLA to SLC with step heights in the gap direction, to thereby form slits as a phase diffraction grating.

On the other hand, in a case where the slits SL are to be formed as the transmissive slits, they may be formed by using the disk 110 which itself is made of a light-transmissive substance, and disposing a substance that shields light by absorption or reflection to the sites other than the slits SLA to SLC, or carrying out any light-shield processing to such sites other than the slits SLA to SLC. Note that how to form the slits SLA to SLC is not particularly limited.

In summary, with the reflective slits, the slits SLA to SLC reflect light, and the other sites do not; with the transmissive slits, the slits SLA to SLC transmit light, and the other sites shield light.

Hereinafter, for ease of explanation, the description of the present embodiment proceeds taking up a case in which the slits SLA to SLC of the tracks TA to TC of the disk 110 are the reflective slits. In such a case where the reflective slits are applied to the disk 110, reflective diffraction interference optical systems can be obtained. Therefore, it becomes possible to reduce noises attributed to variations in the gap g between the disk 110 and each mask 120, whose description will be given later, and to alleviate influence on the detection precision, as compared to a case where the transmissive slits are applied to the disk 110.

The tracks TA and TB are each an exemplary first or second track, and at least one of the tracks TA and TB is formed by curved slits. The present embodiment shows an exemplary case where both the tracks TA and TB are formed by the curved slits.

It is desirable that the tracks TA and TB are formed such that the greater the track radius $r_A$ and track radius $r_B$, the greater the number of slits $n_A$ and the number of slits $n_B$, respectively. That is, because the track radius $r_A$ and track radius $r_B$ of the tracks TA and TB satisfy the relationship of "$r_A<r_B$", the number of slits $n_A$ and the number of slits $n_B$ of the tracks TA and TB are set to satisfy the relationship "$n_A<n_B$". The tracks TA and TB produce two periodic signals whose repetition rate is dependent on respective corresponding ones of the number of slits $n_A$ and the number of slits $n_B$. The repetition rate of the two periodic signals per revolution) (360° of the disk 110 is also referred to as periodicity $m_A$ and periodicity $m_B$. That is, the periodicity $m_A$ and the periodicity $m_B$ assume values dependent on the number of slits $n_A$ and the number of slits $n_B$, respectively. Accordingly, the number of slits $n_A$ and the number of slits $n_B$ of the tracks TA and TB should desirably be set to values that satisfy the required resolution, such that the absolute position x can be detected with the demanded precision.

On the other hand, the track TC is an exemplary third track. Being different from the tracks TA and TB, the track TC is formed by a plurality of concentric slits about the disk center O. Accordingly, the number of slits $n_C$ is not particularly limited.

Pitches $p_{LA}$ to $p_{LC}$, each being the interval between each adjacent ones of slits included in corresponding one of slits SLA to SLC of respective tracks TA to TC, are set to assume an identical value of pitch $p_L$ as to all the tracks TA to TC in the present embodiment ($p_L=p_{LA}=p_{LB}=p_{LC}$). Note that, what is required is at least two of the tracks TA to TC being substantially identical to each other in their respective pitches $p_{LA}$ to $p_{LC}$, and inclusion of the other track being different in pitch is possible. Thus, setting a plurality of tracks TA to TC to have substantially equivalent pitches $p_{LA}$ to $p_{LC}$, it becomes possible to form respective diffraction interference optical systems for the tracks TA to TC in a similar mode, whereby designing, development and manufacture (which may also be referred to as manufacture and other procedures) can be facilitated. In particular, as in the present embodiment, such pitches $p_{LA}$ to $p_{LC}$ of all the tracks TA to TC being substantially equivalent to one another drastically facilitate manufacture and other procedures. Here, as used in the present embodiment, each of the "pitches $p_{LA}$ to $p_{LC}$" refers to the arrangement interval between each adjacent ones of slits included in corresponding one of the slits SLA to SLC. Further, in the present embodiment, the pitch $p_{LA}$ and the pitch $p_{LB}$ of the curved slits each refer to the interval (pitch) with reference to the slit positioned at the center of corresponding one of width $w_A$ and width $w_B$ of the track TA and the track TB.

(Shape of Slits SL)

Now, a description will be given of the shape of the slits SLA to SLC in the tracks TA to TC, respectively.

In the track TC, the slits SLC are formed as a plurality of concentric circles about the disk center O (rotary axis AX). The slits in such a shape is also referred to as the "concentric slits".

On the other hand, in the encoder 100 according to the present embodiment, as has been described in the foregoing, for the purpose of making it possible to unify the pitches $p_{LA}$ to $p_{LC}$ of a plurality of tracks TA to TC to the pitch $p_L$, and to achieve miniaturization and drastic facilitation of the manufacture and other procedures, the slits SLA and SLB of the tracks TA and TB are formed not as radial slits, but as "curved slits" which are all curved in an identical direction from the original radial direction. It is also possible that at least one of the tracks TA to TC is formed by the curved slits. In this case, the other track(s) may be formed by, e.g., "radial slits" that are radially shaped. As in the present embodiment, in a case where such curved slits are included, facilitation of the aforementioned adjustment, miniaturization, and manufacture and other procedures of the pitches $p_{LA}$ to $p_{LC}$ can be realized. The curved slits are detailed later.

(Magnet MG)

The magnet MG structures part of an exemplary revolution detection mechanism for detecting a rough absolute position x per revolution. The magnet MG is disposed such that the magnetic poles (the north pole and the south pole) are symmetrically positioned with respect to the disk center O (rotary axis AX) on a plane parallel to the disk surface. In a case where a revolution detection mechanism different from that of the present embodiment is employed, the magnet MG may be structured in other manner in accordance with such different mechanism.

The revolution detection mechanism may also be referred to as the "1X detection mechanism", "first detection mechanism" or the like.

On the other hand, as described in the foregoing, the number of slits $n_A$ and the number of slits $n_B$ of the tracks TA and TB are set to satisfy the relationship of $n_A < n_B$. The periodicity $m_A$ and periodicity $m_B$ of the periodic signals respectively obtained based on the tracks TA and TB each represent the detection precision as to the corresponding one of the tracks TA and TB, which respectively correspond to the number of slits $n_A$ and the number of slits $n_B$.

In other words, as described in the foregoing, the 1X detection mechanism detects the rough absolute position x falling within a range of one revolution.

A detection mechanism based on the track TA can detect an absolute position x falling within a range narrower than one revolution, i.e., with the precision higher than the 1X detection mechanism exhibits. As used herein, the detection mechanism based on the track TA is also referred to as the "first incremental detection mechanism" or the "second detection mechanism".

The detection mechanism based on the track TB can detect an absolute position x falling within a range narrower than the range covered by the first incremental detection mechanism, i.e., with the precision higher than the first incremental detection mechanism exhibits. As used herein, the detection mechanism based on the track TB is also referred to as the "second incremental detection mechanism" or the "third detection mechanism".

On the other hand, the detection mechanism based on the track TC detects, when there is any eccentricity between the disk center O of the disk 110 and the rotary axis AX, an eccentricity signal whose periodicity $m_C$ is dependent on the amount of the eccentricity. As used herein, the detection mechanism based on the track TC is also referred to as the "eccentricity detection mechanism" or the "fourth detection mechanism".

That is, the encoder 100 of the absolute type according to the present embodiment processes the positions x respectively detected by the 1X, first incremental, and second incremental detection mechanisms, so as to detect the absolute position x, with the detection precision as high as that exhibited by the second incremental detection mechanism. Further, the encoder 100 processes the absolute position x and the like based on the eccentricity signal from the eccentricity detection mechanism, so as to detect the absolute position x with a suppressed error attributed to the eccentricity of the disk 110.

It is to be noted that, while the first incremental detection mechanism, the second incremental detection mechanism and the eccentricity detection mechanism are different from one another in the number of slits $n_A$ to $n_C$, the shape of the slits and the like, they each have one individual and independent diffraction interference optical system, and are similar to one another in founding the principle of detection on use of an optical diffraction interference optical system. Therefore, hereinafter, the first incremental detection mechanism, the second incremental detection mechanism and the eccentricity detection mechanism are also collectively referred to as the "optical detection mechanism".

(1-2-2. Detector 130X, Detectors 130A to 130C)

Figure 4:
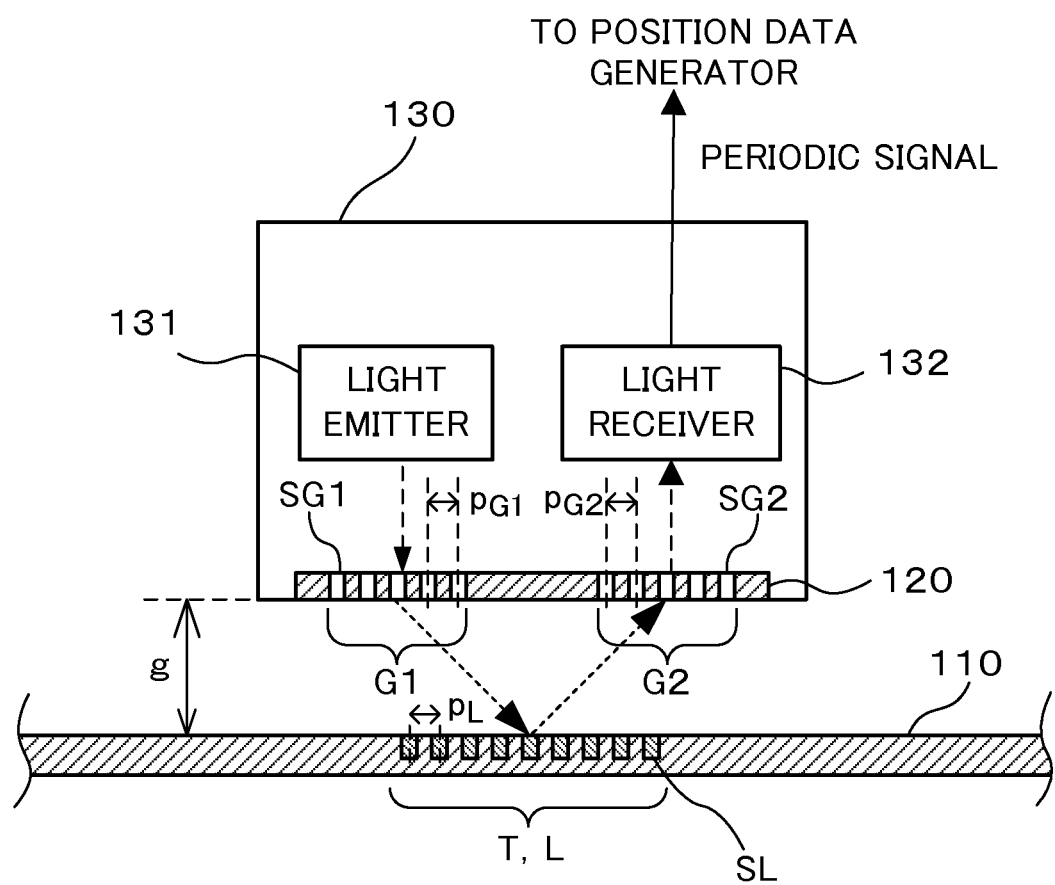
FIG. 4 is an explanatory diagram for describing an optical detection mechanism included in the encoder according to the first embodiment of the present invention.
Figure 5:
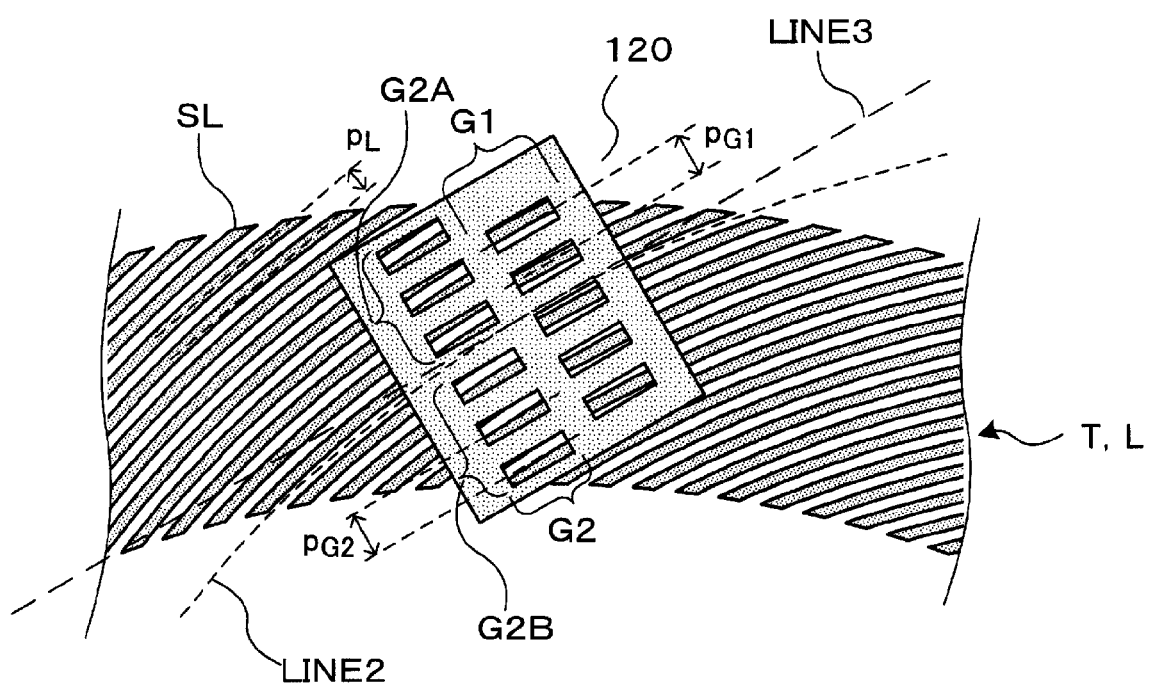
FIG. 5 is an explanatory diagram for describing an optical detection mechanism included in the encoder according to the first embodiment of the present invention.

Next, with reference to FIGS. 2 to 5, the following discusses the detection mechanisms more specifically, while explaining the detector 130X and detectors 130A to 130C. FIGS. 4 and 5 are explanatory diagrams for describing the optical detection mechanisms included in the encoder according to the present embodiment.

(1X Detection Mechanism)

The detector 130X is disposed so as to face the magnet MG, to thereby structure the 1X detection mechanism in conjunction with the magnet MG. As shown in FIG. 2, the gap between the detector 130X and the magnet MG is set to be identical to the gap g between each of the other detectors 130A to 130C and the disk 110. As a result, it becomes possible to adjust the gap g as to all the detectors 130X, 130A to 130C at once, whereby the manufacture and other procedures are facilitated. Note that the gap g as to the detector 130X may assume a value different from the gap g as to each of the detectors 130A to 130C.

The detector 130X detects the rotation of the magnetic field direction of the magnet MG in accordance with the rotation of the disk 110. The detector 130X is not particularly limited, so long as it is structured to be capable of detecting the magnetic field direction in this manner. Examples of the detector 130X include a magnetic angle sensor such as an MR (magnetoresistive effect) element or a GMR (giant magnetoresistive effect) element. Another possible manner is to employ a magnetic field detecting element such as a Hall element as the detector 130X, to detect the magnetic field intensity in each of two axial directions perpendicular to the rotary axis AX, and to calculate the magnetic field direction of the magnet MG based on the detection signal from the magnetic field detecting element, to thereby detect the rotation of the disk 110.

The detection signal produced by the detector 130X is a sinusoidal electric signal that achieves 360° rotation (i.e., one period) in electrical angle $\phi_x$ while the rotary angle θ (position x) of the disk 110 reaches 360°. The detection signal represents a rough absolute position x per revolution of the disk 110. As used herein, the electric signal detected by the detector 130X is also referred to as the "1X detection signal". The 1X detection signal is output to the position data generator 140.

(Optical Detection Mechanism)

The detector 130A is an exemplary first detector or second detector, which is disposed so as to face the track TA, to thereby structure the first incremental detection mechanism in conjunction with the track TA. The detector 130B is an exemplary first detector or second detector, which is disposed so as to face the track TB, to thereby structure the second incremental detection mechanism in conjunction with the track TB. The detector 130C is an exemplary third detector, which is disposed so as to face the track TC, to thereby structure the eccentricity detection mechanism in conjunction with the track TC.

As has been described above, the optical detection mechanisms structured by their respective detectors 130A to 130C are similar to one another in that they each have an independent diffraction interference optical system. Accordingly, a description will now be given of one exemplary optical detection mechanism with reference to FIG. 4, and differences among the optical detection mechanisms will individually be described later.

Consequently, in the following, in proceeding the description focusing on one exemplary optical detection mechanism, as shown in FIG. 4, the detector (detectors 130A to 130C), the track (tracks TA to TC) and the rotary grating (rotary gratings LA to LC) associated with the one exemplary optical detection mechanism may also be simply referred to as the "detector 130", the "track T" and the "rotary grating L"; and the slits (slits SLA to SLC) included in the rotary grating L may also be simply referred to as the "slit SL". The pitch (pitches $p_{LA}$ to $p_{LC}$) of the slit SL may also be simply referred to as the "pitch $p_L$"; the number of slits (the number of slits $n_A$ to $n_C$) may also be simply referred to as the "number of slits n"; and the periodicity (periodicity $m_A$ to $m_C$) of the periodic signal obtained with the optical detection mechanism may also be simply referred to as the "periodicity m".

As shown in FIG. 4, the detector 130 includes the mask 120, the light emitter 131, and the light receiver 132.

The mask 120 is fixedly disposed so as to face the disk 110 away therefrom by the gap g between them. While the mask 120 is made of a light-shielding material, it includes two optical fixed gratings G1 and G2 (diffraction gratings that are fixed) each having a plurality of light-transmissive slits SG1 and SG2, respectively. That is, the mask 120 allows light to pass through the slits SG1 and SG2 of the fixed gratings G1 and G2. The fixed gratings G1 and G2 constitute, in conjunction with the rotary grating L, a three-grating diffraction interference optical system.

While the fixed grating G1 and the fixed grating G2 are formed at the identical mask 120 in the present embodiment, the fixed grating G1 and the fixed grating G2 may separately be formed on separate masks 120. As is employed in the present embodiment, use of the two fixed gratings G1 and G2 which are equidistant from the rotary grating L in conjunction with adoption of the reflective slit as the slits SL of the rotary grating L provides a constant gap g for each of the fixed gratings G1 and G2, without being affected by any variations in the positional relationship between the disk 110 and the detector 130. Thus, it becomes possible to alleviate the influence of the varying gap g on the diffraction interference optical system. It is to be noted that, in a case where the fixed grating G1 and the fixed grating G2 are separately formed on separate masks 120, they should desirably be disposed such that the distance (gap g) between the fixed grating G1 and the rotary grating L and the distance (gap g) between the rotary grating L and the fixed grating G2 are equal to each other on the identical plane of the disk 110.

Now, a description will be given of the relationship as to the gap g of each of the detectors 130A to 130C of the optical detection mechanism.

In the present embodiment, because the pitches $p_{LA}$ to $p_{LC}$ of the slits SLA to SLC of the tracks TA to TC are set to assume the substantially equal value of pitch $p_L$, every gap g measured between each of the detectors 130A to 130C and the corresponding tracks TA to TC, i.e., the disk 110, can be set to assume a substantially constant value. That is, in the present embodiment, as shown in FIG. 2, the gap g between the rotary grating LA and its corresponding fixed gratings G1 and G2, the gap g between the rotary grating LB and its corresponding fixed gratings G1 and G2, and the gap g between the rotary grating LC and its corresponding fixed gratings G1 and G2 can all be set to assume a substantially equal value.

Setting in this manner, the diffraction interference optical systems respectively associated with the detectors 130A to 130C can identically be designed and developed based on such gap g. Furthermore, adjustment of the gap g in course of manufacture can be carried out at once as to the detectors 130A to 130C. Hence, the manufacture and other procedures can be facilitated. Because the gap g as to each of the detectors 130A to 130C can constantly be set, the mask 120 shown in FIG. 4 which is allotted to each of the detectors 130A to 130C can integrally be formed to be shared among the detectors 130A to 130C, and the detectors 130A to 130C can be integrated. Thus, the manufacture and other procedures are can further be facilitated.

It goes without saying that such operation and effect can similarly be achieved by equalizing just the gaps g of any two of the rotary gratings LA to LC (one example of one track and the other track) with respect to their corresponding fixed gratings G1 and G2. However, it is desirable that those two optical detection mechanisms having their gaps g equalized should be the optical detection mechanisms each having the pitch $p_L$ of the slits included in the track T equalized to the other's.

Next, a description will be given of the fixed gratings G1 and G2, along with the description of the light emitter 131 and the light receiver 132.

The light emitter 131 includes a light source and emits light toward the fixed grating G1 of the mask 120. Though the wavelength and intensity of the light emitted from the light emitter 131 is not particularly limited, such parameters may be determined as appropriate taking into consideration of the characteristic of the diffraction interference optical system, the required position resolution or the like. In the present embodiment, diffused light is adopted as the emitted light. Adopting the diffused light, it becomes possible to regard the slits SG1 of the fixed grating G1, a description of which slits SG1 will be given later, as substantially linear light sources, and hence the diffraction interference effect can be enhanced. It is to be noted that, it is also possible to adopt collimated light, laser light, converged light or the like as the emitted light, provided that the slits SG1 can be regarded as substantially linear light sources. It goes without saying that the light emitter 131 may include any prescribed optical element such as a diffusing lens, depending on the characteristic or the like of the employed light such as the collimated light, the laser light, the converged light, and the diffused light.

The fixed grating G1 is formed at the position where the light emitted by the light emitter 131 is incident upon. The fixed grating G1 has a plurality of transmissive slits SG1, which diffract the entered light. Thus, the slits SG1 can convert the light with which the disk 110 has been irradiated into the light whose source is the slits SG1 as substantially linear light sources.

The pitch $p_{G1}$ of the slits SG1 of the fixed grating G1 is formed so as to satisfy the following relationship between the pitch $p_L$ of the slits SL of the rotary grating L: "$p_{G1}=i \times p_L$ (i=1, 2, 3 ... )". It is to be noted that, the intensity of the obtained periodic signal can often be enhanced particularly in a case where "i=1, 2"; further, the intensity of the periodic signal can often be enhanced in a case where "i=2" to an extent greater than in a case where "i=1". On the other hand, the periodicity m of the periodic signal also varies not only depending on the number of slits n, but also on the value "i". Specifically, the periodicity m is obtained by "$m=2 \times n/i$", at least in the case where "i=1, 2". In the following, for ease of explanation, the description will proceed as being predicated on the case where "i=2", i.e., "$p_{G1}=2p_L$" and "m=n".

The light transmitted through the fixed grating G1 diverges in the width direction of the fixed grating G1 in accordance with the incident angle of itself being incident upon the fixed grating G1. Accordingly, for the purpose of improving the signal intensity, it is desirable to set the width of each slit SL of the rotary grating L to be wider than the width of each slit SG1 of the fixed grating G1, taking into consideration of the angle of divergence. In doing so, setting the width of each slit SL of the rotary grating L to further be wider or narrower than the expected width of the light upon arrival after having transmitted through the fixed grating G1 brings about a further improvement in the stability of the signal against the mounting tolerance between the fixed grating G1 and the rotary grating L.

In a similar manner, the light reflected off the rotary grating L diverges in the width direction of the rotary grating L in accordance with the incident angle of itself being incident upon the rotary grating L. Accordingly, for the purpose of improving the signal intensity, it is desirable to set the width of each slit SG2 of the fixed grating G2, whose description will be given later, also to be wider than the width of each slit SL of the rotary grating L, taking into consideration of the angle of divergence. In this case also, in doing so, setting the width of each slit SL of the fixed grating G2 to further be wider or narrower than the expected width of the light upon arrival after having been reflected off the rotary grating L brings about a further improvement in the stability of the signal against the mounting tolerance between the fixed grating G2 and the rotary grating L.

Note that, it goes without saying that the relationship as to the slit width among the fixed grating G1, the fixed grating G2 and the rotary grating L is not particularly limited, so long as the signal intensity and also the stability of the signal against the mounting tolerance are fully secured.

It is desirable that a plurality of slits SG1 of the fixed grating G1 are formed substantially in parallel to the slits SL to which the slits SG1 face, for the purpose of enhancing the diffraction interference effect of the diffraction interference optical system, which is structured by the fixed grating G1 in conjunction with the rotary grating L and the other fixed grating G2, to thereby reduce the noise.

That is, as shown in FIG. 3, because the slits SLA and SLB of the rotary gratings LA and LB are formed as the curved slits, it is desirable that a plurality of slits SG1 and SG2 of respective corresponding fixed gratings G1 and G2 of each of the detectors 130A and 130B are formed as the curved slits so as to be in parallel to the curved slits to which they face. On the other hand, because the slits SL of the rotary grating LC are formed as the concentric slits, it is desirable that a plurality of slits SG1 and SG2 of respective corresponding fixed gratings G1 and G2 of the detector 130C are formed as the concentric slits so as to be in parallel to the concentric slits to which they face.

Meanwhile, in general, because the pitch of radial slits is short enough as compared to the entire circumferential length of the track, the radial slits can optically be regarded as parallel slits. Accordingly, a plurality of slits of the fixed gratings of the detectors associated with the radial slits can be formed as the "parallel slits" being parallel to one another.

Hence, in the present embodiment also, a plurality of slits SG1 of the fixed grating G1 of the detectors 130A and 130B associated with the curved slits, or those of the detector 130C being the concentric slits, can be formed as parallel slits as shown in FIG. 5. In this case, it is desirable that the parallel slits of the fixed grating G1 associated with the curved slits are disposed so as to be substantially in parallel to the tangent LINE3 which is determined at least at one point in the curved slits, as shown in FIG. 5. Similarly, it is desirable that the parallel slits of the fixed grating G1 associated with the concentric slits are disposed so as to be substantially in parallel to the tangent which is determined at least at one point in the concentric slits. Thus, adopting the parallel slits for both the fixed gratings G1 respectively associated with the curved slits and the concentric slits, it becomes possible to use identically structured fixed gratings G1 for both of the fixed gratings G1. This makes it possible to carry out manufacture and other procedures with further ease, and additionally, to reduce the manufacturing costs.

As shown in FIG. 4, the light diffracted by the fixed grating G1 is emitted to the rotary grating L associated with the fixed grating G1. Then, the rotary grating L irradiated with the light reflects off the light at its slits SL. Here, the light reflected off is further diffracted by the rotary grating L. Then, the light diffracted by the rotary grating L is emitted to the fixed grating G2.

The fixed grating G2 is formed at the position where the light diffracted by the rotary grating L is incident upon. The pitch $p_{G2}$ of the slits SG2 of the fixed grating G2 is formed to assume the value identical to the pitch $p_{G1}$ of the slits SG1 of the fixed grating G1. That is, in the present embodiment, the following relationship is established: "$p_{G1}=p_{G2}=2 \times p_L$". Further, the slits SG2 are the same as the slit SG1 of the fixed grating G1 in their shape and in the positional relationship between the slits SL of the rotary grating L and, therefore, detailed description thereof is not repeated herein.

Being different from the fixed grating G1, the fixed grating G2 is formed as being divided into at least two regions (for example, regions G2A and G2B shown in FIG. 5). The slits SG2 are formed to have uniform pitch $p_{G2}$ within the particular region, but the slits SG2 are displaced by "$p_{G2}/4$" between the regions. Hereinafter, for ease of explanation, the description will proceed taking up the case where the fixed grating G2 is divided into two regions G2A and G2B as shown in FIG. 5.

On the other hand, as shown in FIG. 4, the light diffracted by the rotary grating L is emitted to the fixed grating G2. The light emitted to the fixed grating G2 forms interference fringes resulting from the interference of the light beams diffracted by a plurality of slits SL of the rotary grating L. The position of the bright portions of the interference fringes shifts, in accordance with the change in the positional relationship between the fixed grating G1 and the rotary grating L brought about by the rotation of the disk 110. As a result, the intensity of the light beams transmitted through the slits SG2 of the region G2A and that of the region G2B being displaced by "$p_{G2}/4$" sinusoidally increase and decrease by a shift of 90°.

The light receiver 132 is disposed so as to receive the light transmitted through the slits SG2 of the fixed grating G2. The light receiver 132 includes a light receiving element such as a photodiode and converts the intensity of the received light into an electric signal. Here, the light receiver 132 has a plurality of, e.g., two, light receiving surfaces so as to be capable of generating a separate electric signal for each of the regions G2A and G2B.

The electric signals generated by the light receiver 132 are each a substantially sinusoidal electric signal (which is also referred to as the "periodic signal") of a prescribed period which is repeated every time the disk 110 shifts by an amount commensurate to the pitch p or the like. On the other hand, the two periodic signals respectively corresponding to the regions G2A and G2B are the periodic signals which are 90° out of phase from each other, similarly to the intensity of the light beams passing through the slits SG2 of the region G2A and that of the region G2B. The two periodic signals are also respectively referred to as the "A-phase signal" and the "B-phase signal". The two periodic signals of A and B phases obtained from each of the first incremental detection mechanism, the second incremental detection mechanism and the eccentricity detection mechanism are also collectively referred to as the "first incremental detection signal", the "second incremental detection signal" and the "eccentricity detection signal". The first incremental detection signal and the second incremental detection signal are exemplary first detection signal and second detection signal.

In this manner, in the optical detection mechanism, a three-grating diffraction interference optical system is structured. Hence, a desired periodic signal can be detected based on the interference that would be caused by the relationship among the pitches $p_L$, $p_{G1}$, $p_{G2}$ and the like, irrespective of the size of the gap g.

Meanwhile, as to the geometrical optics encoder, because it simply receives light transmitted through the slits $S_L$, a greater gap g results in an increase in the noise as being influenced by the light of the diffraction component or light of the diffusion component, and hence the gap g must be set smaller. In contrast thereto, with the diffraction interference optical system as in the present embodiment, the gap g between the fixed member and the rotary member can be set greater. As a result, flexibility in designing and development can be increased, and the possible trouble of interference occurring between the fixed member and the rotary member caused by shock or the like can be suppressed.

It is to be noted that, while the description of the present embodiment has been given of the exemplary case of the three-grating (i.e., the rotary grating L and the fixed gratings G1 and G2) diffraction interference optical system, the present invention is not limited thereto. For example, the fixed grating G2 may be replaced by a band-like light receiving element having light receiving surfaces at positions corresponding to the slits SG2 of the fixed grating G2, to thereby implement a pseudo-three-grating diffraction interference optical system. Furthermore, even replacement of the fixed grating G1 by band-like or linear light emitting elements or the like that emit light at the positions corresponding to the slits SG1 of the fixed grating G1 can similarly implement a pseudo-three-grating diffraction interference optical system. It goes without saying that the number of gratings is not particularly limited, so long as a similar diffraction interference optical system can be implemented.

Now, with reference to FIG. 3, a description will be given of the disposition positions of the detectors 130A to 130C in the following. The tangents LINEA to LINEC shown in FIG. 3 respectively represent the tangents of the slits of the tracks TA to TC. That is, the tangents LINEA and LINEB are the tangents of the curved slits SLA and SLB of the tracks TA and TB, respectively. On the other hand, the tangent LINEC is the tangent of the concentric slit SLC of the track TC. The detectors 130A to 130C are disposed at positions where the tangents LINEA to LINEC establish a parallel positional relationship.

In more detail, the detector 130A is disposed to face the track TA at a position where the slits SLA of the track TA are in parallel to the tangent LINEB of the slit SLB of the track TB, at a position where the detector 130B faces the track TB. On the other hand, the detector 130C is similarly disposed to face the track TC at a position where the slits SLC of the track TC are in parallel to the tangent LINEB of the slit SLB of the track TB, at a position where the detector 130B faces the track TB.

Thus, in a case where the periodic signals are detected at the positions where the tangents of the slits SL are in parallel to one another, the detector 130A and the detector 130B detect the first incremental detection signal and the second incremental detection signal, respectively, containing the error attributed to the eccentricity of the disk 110 at an identical timing. Hence, when the position x is calculated based on the detector 130A and the detector 130B, the error which may otherwise contained due to the asynchronicity of the signals can be suppressed. On the other hand, the detector 130C can also obtain the eccentricity signal commensurate to the eccentricity at the position where the tangents are in parallel. Therefore, the detector 130C can detect at the identical timing the error attributed to the eccentricity contained in the first incremental detection signal and the second incremental detection signal at the identical timing.

(1-2-3. Structure of Curved Slits)

Figure 6:
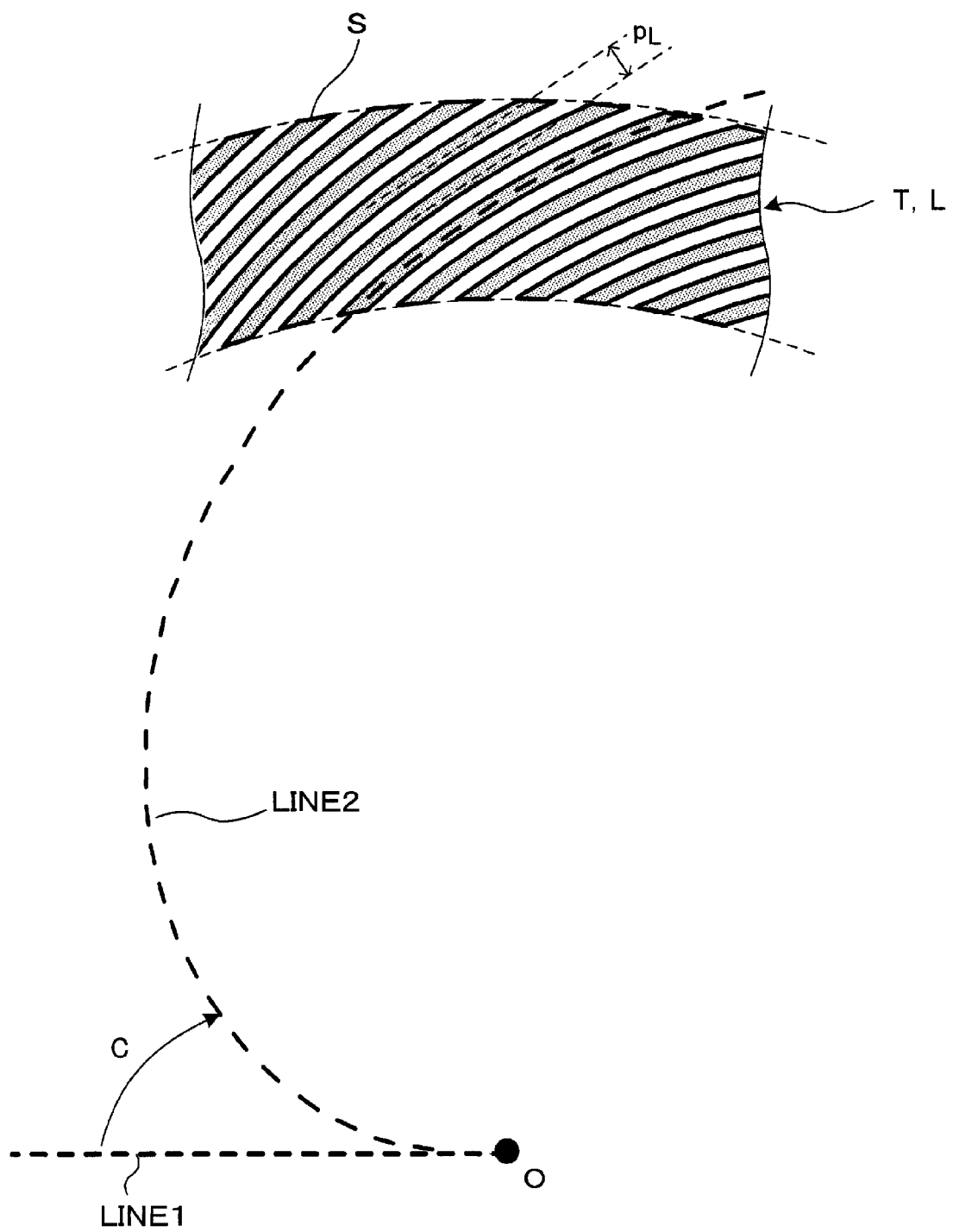
FIG. 6 is an explanatory diagram for describing curved slits included in the encoder according to the first embodiment of the present invention.

In the foregoing, the description has been given of the structure of the encoder 100 according to the first embodiment of the present invention. Next, with reference to FIGS. 5 and 6, a detailed description will be given of the curved slits employed in the rotary gratings LA and LB. FIG. 6 is an explanatory diagram for describing the curved slits of the encoder according to the present embodiment.

(Curved Slits within One Track T)

First, with reference to FIG. 6, a description will be given taking up one of the curved slits, that is, one of the slits SLA of the rotary grating LA of the track TA and the slits SLB of the rotary grating LB of the track TB, as an example. The difference between the slits SLA and the slits SLB will be individually explained.

The slits SL of the rotary gratings L according to the present embodiment are arranged to form ring-like tracks T. As has been described above, and as shown in FIG. 6, the slits SL of at least one of the rotary gratings L are formed as curved slits and not as concentric slits or radial slits.

As shown in FIG. 6, the slits SLA and SLB (simply referred to as the "slits SL" herein) formed as the curved slits are each formed along a curved line LINE2, which is a radial line LINE1 originating from the disk center O (rotary axis AX) being circumferentially curved at a prescribed curvature C.

There are a variety of possible methods of forming the slits SL along the curved lines LINE2. One exemplary formation method of the slits SL is as follows.

The radial lines LINE1 corresponding to the slits SL are set as many as the number of slits n, at every angle obtained by equiangularly dividing one revolution, i.e., $2\pi$ (360°), by the number of slits n to be arranged within that particular track T. Thereafter, the radial lines LINE1 are curved in an identical circumferential direction at an identical curvature C, whereby the curved lines LINE2 of the slits SL are set. Then, along the curved lines LINE2 set in this manner, the slits SL are formed each with a prescribed width.

Further, specifically using equations, the one exemplary method of forming the slits SL is described.

Here, the disk center O is the origin; the distance from the origin is l; the angle from the reference line that passes through the origin is $\theta$; the inner diameter and the outer diameter of the track T are $r_{IN}$ and $r_{OUT}$, respectively; the number of slits included in the rotary grating L of the track T is n; and the slits are identified by j (j=0, 1, 2 ..., n−1). Then, the radial lines LINE1 are expressed in polar coordinates by the following equation 1:

$$\text{LINE1}=(l, j \times 2\pi/n) \quad \text{(Equation 1)}$$

where $r_{IN} \leq l \leq r_{OUT}$

Then, when the curvature is C, and a radius (i.e., the radius at the center in the width direction of the track T) with which the pitch of a plurality of slits SL of the rotary grating L assumes a desired value $p_L$ is $r_0$, the curved lines LINE2 are expressed in polar coordinates by the following equation 2. The slits SL are formed along the curved lines LINE2, within a prescribed width w ($=r_{OUT}-r_{IN}$) of the track T.

$$\text{LINE2}=(r_0(1-C\theta), \theta+j\times 2\pi/n) \quad \text{(Equation 2)}$$

where $r_{IN} \leq r_0(1-C\theta) \leq r_{OUT}$

In this exemplary curved slits formation, the curvature C is expressed by the following equation 3.

$$C=\tan[\sin^{-1}\{p_L \times n/(2\pi r_0)\}] \quad \text{(Equation 3)}$$

Here, it is desirable that each track T is formed to have a width w ($=r_{OUT}-r_{IN}$) with which the light having transmitting through the diffraction grating G2, and thereafter reflected off the rotary grating L which received the light at the light receiving element secures a sufficient amount of light. In each of the diffraction interference optical systems according to the present embodiment, with the width w of the track T which assumes a value, e.g., twenty to fifty times as great as the pitch $p_L$ of the rotary grating L, a sufficient amount of light can be obtained. Accordingly, as can be seen from equation 3, the slits SL being the curved slits reach the track outer diameter ($r_{OUT}$) at a position by an angle $\theta$ within 180° from the track inner diameter ($r_{IN}$). Every curved slit SL forms the angle $\theta$ within 180°, so as not to revolve along the track T. By forming the curved slits in this manner, it becomes possible to enhance the intensity of the disk 110, to miniaturize the disk 110, and to facilitate formation of the slits SL.

On the other hand, in the diffraction interference optical system structured by the rotary grating L of the present embodiment, generally, the more uniform the pitch of a plurality of slits SL included in the rotary grating L without being biased lengthwise, the smaller the noise of the obtained sinusoidal periodic signals and the higher the position detection precision. In other words, as to a shift from the center of the width w of the track T along each slit SL toward the track inner or outer diameter, the smaller the increase rate or reduction rate of the deviation amount from the pitch $p_L$ with reference to the shift amount, the smaller the noise, and the higher the detection precision.

Now, with the curved slits as employed in the present embodiment, because the slits SL are formed as being curved, the change amount of the pitch (which is also referred to as the "pitch's change rate") of the slits SL in the formation direction of the slits SL (the curved line LINE2 direction) can be reduced. As a result, with the encoder 100 according to the present embodiment, the detection precision of the periodic signals obtained by the optical detection mechanisms can be improved, to thereby improve the position detection precision.

More specifically, in a case where slits such as radial slits, for example, are employed, each slit is to be formed on the radial line LINE1. In this case, the length in the slit formation direction (the radial line LINE1) becomes substantially equal to the width w of the track T. Therefore, the pitch's change rate of each slit in the formation direction is relatively great. This relatively great pitch's change rate invites a reduction in the detection precision of the periodic signals. Such a reduction in the detection precision is greater as the number of slits n is smaller. In contrast thereto, with the curved slits, the length in the formation direction of the slits SL (the curved line LINE2) can be elongated by the length corresponding to the curvature C, as compared to the radial slits. As a result, the pitch's change rate of the slits SL can relatively be set smaller, whereby the detection precision of the periodic signals can be improved.

Accordingly, thanks to use of such curved slits, with the encoder 100 according to the present embodiment, a plurality of tracks TA to TC differing in the periodicity m of the periodic signals can be set without any reduction in flexibility in designing, development and the like, and without impairing the detection precision of the periodic signals. Hence, according to the present embodiment, the encoder 100 realizing high precision and being compact can easily be formed.

Further, with diffraction interference optical systems in general, an optimum gap g between the rotary grating L and the fixed gratings G1 and G2 is dependent on the wavelength $\lambda$ emitted from the light emitter 131 and the pitch $p_L$ of a plurality of the slits SL of the rotary grating L. For example, in a three-grating optical system, when the relationship $p_{G1}=p_L=p_{G2}$ is established, the optimum gap g is obtained when the following equation 4 is satisfied; and when the relationship $p_{G1}=2\times p_L=p_{G2}$ is established, the optimum gap g is obtained when the following equation 5 is satisfied, where k is a positive integer:

$$g=(2\times k-1)\times p_L^2/4\lambda \quad \text{(Equation 4)}$$

$$g=(2\times k)\times p_L^2/\lambda \quad \text{(Equation 5)}$$

In contrast thereto, with curved slits such as employed in the present embodiment, the pitch $p_L$ of a plurality of slits SL is expressed by equation 6 using the function f of the number of slits n, the track radius r ($=r_0$), and the curvature C:

$$p_L = f(n, r, C) \quad \text{(Equation 6)}$$

$$= (2\pi r/n) \times \sin(\tan^{-1} C)$$

Thus, without the necessity of changing the number of slits n (which corresponds to the period of the periodic signals) and the track radius r, by simply setting the curvature C as appropriate, the pitch p can be set to an optimum value with which the diffraction interference optical system is structured. As a result, it becomes possible to freely set the number of tracks n, the track radius r and the like, to achieve miniaturization with ease, and to carry out designing and development and the like with ease.

Meanwhile, being different from the present embodiment, when each of the slits SL is formed to revolve in each track T by one or more revolutions, such slits are referred to as the "multiple spiral slits". With such multiple spiral slits, the number of slits SL accumulated in the radius direction becomes great and the width w of the track T becomes great, whereby the miniaturization is hindered. Hence, the flexibility in designing and development is reduced, which consequently makes the manufacture itself difficult. In contrast thereto, the slits SL according to the present embodiment are formed as the curved slits and not as the multiple spiral slits. As a result, as described above, it becomes possible to enhance the flexibility in designing and development to facilitate manufacture and miniaturization.

It is to be noted that the curved slit formation example and the equations as to the curved lines LINE2 having been described in the foregoing are merely examples, and it is not necessary to actually formulate such equations. That is, so long as the slits SL that extend along the curved lines LINE2 curving in the circumferential direction are formed, the formation method, designing method and the like are not particularly limited.

(Positional Relationship Between Curved Slits and Slits on Fixed Grating Side)

In a case where the parallel slits are used for the fixed gratings G1 and G2, as shown in FIG. 5, the fixed gratings G1 and G2 are disposed such that the slits SG1 and SG2 are positioned in parallel to the tangent LINE3 of the curved line LINE2 of one of the slits SL of the rotary grating L with which the fixed gratings G1 and G2 are associated. With the curved slits as used in the present embodiment, the region where the fixed gratings G1 and G2 being the parallel slits and the rotary grating L are in parallel to each other can widely be secured even in a case where the disposition positions of the fixed gratings G1 and G2 are displaced to some extent, thanks to the change amount of the pitch $p_L$ of the curved slits being relatively small. Hence, while achieving a further improvement in detection precision of the periodic signals, it becomes possible to extremely facilitate the manufacture and other procedures.

(Relationship Among Curved Slits Included in Different Types of Tracks)

In the foregoing, the description has been given of the curved slits in one track T. Now, with reference to FIGS. 2 and 3, the relationship among curved slits included in different tracks TA to TC will be described.

In the present embodiment, as shown in FIG. 2, the gap g between everyone of the rotary gratings LA to LC of the tracks TA to TC, respectively, and the mask 120 of corresponding one of the detectors 130A to 130C is set at a substantially constant value. On the other hand, in order to structure diffraction interference optical systems, it is important to realize the pitch $p_L$ of the slits SL corresponding to the gap g such that the above-noted equation 4 or 5 is satisfied.

Accordingly, in the present embodiment, as shown in FIG. 3, the curvature C of the slits SLA of the track TA is set such that the pitch $p_{LA}$ of the slits SLA becomes equal to the pitch $p_{LB}$ of the slits SLB of the track TB. It is to be noted that the pitch $p_{LC}$ of the concentric slits SLC of the track TC is also set so as to be equal to the other pitches $p_{LA}$ and $p_{LB}$ of the tracks TA and TB.

On the other hand, the number of the slits $n_A$ of the track TA is different from the number of the slits $n_B$ of the track TB. Accordingly, as can also be seen from the above-noted equation 3, the curvature C of the track TA are set so as to be different from the curvature C of the track TB. Hence, the pitch $p_{LA}$ in the track TA and the pitch $p_{LB}$ in the track TB, both of which tracks are formed with the curved slits, can be equalized with each other.

As a result of the foregoing, the pitches $p_{LA}$ to $p_{LC}$ of the slits SLA to SLC of the entire tracks TA to TC can be set to a constant value. Hence, the detectors 130A to 130C can be disposed with a constant gap g, each of which detectors 130A to 130C forming a diffraction interference optical system. When a plurality of detectors 130A to 130C can be formed with a constant gap g in this manner, in addition to the advantage that the detectors 130A to 130C can be adjusted in the gap g direction with ease, the detectors 130A to 130C can advantageously be formed integrally. In a case where the detectors 130A to 130C are integrally formed, the mask 120 allotted to each of them can similarly be implemented as one integrated mask. In this case, it becomes possible to facilitate manufacture while improving flexibility in designing and the like.

(1-2-4. Position Data Generator 140)

Figure 7:
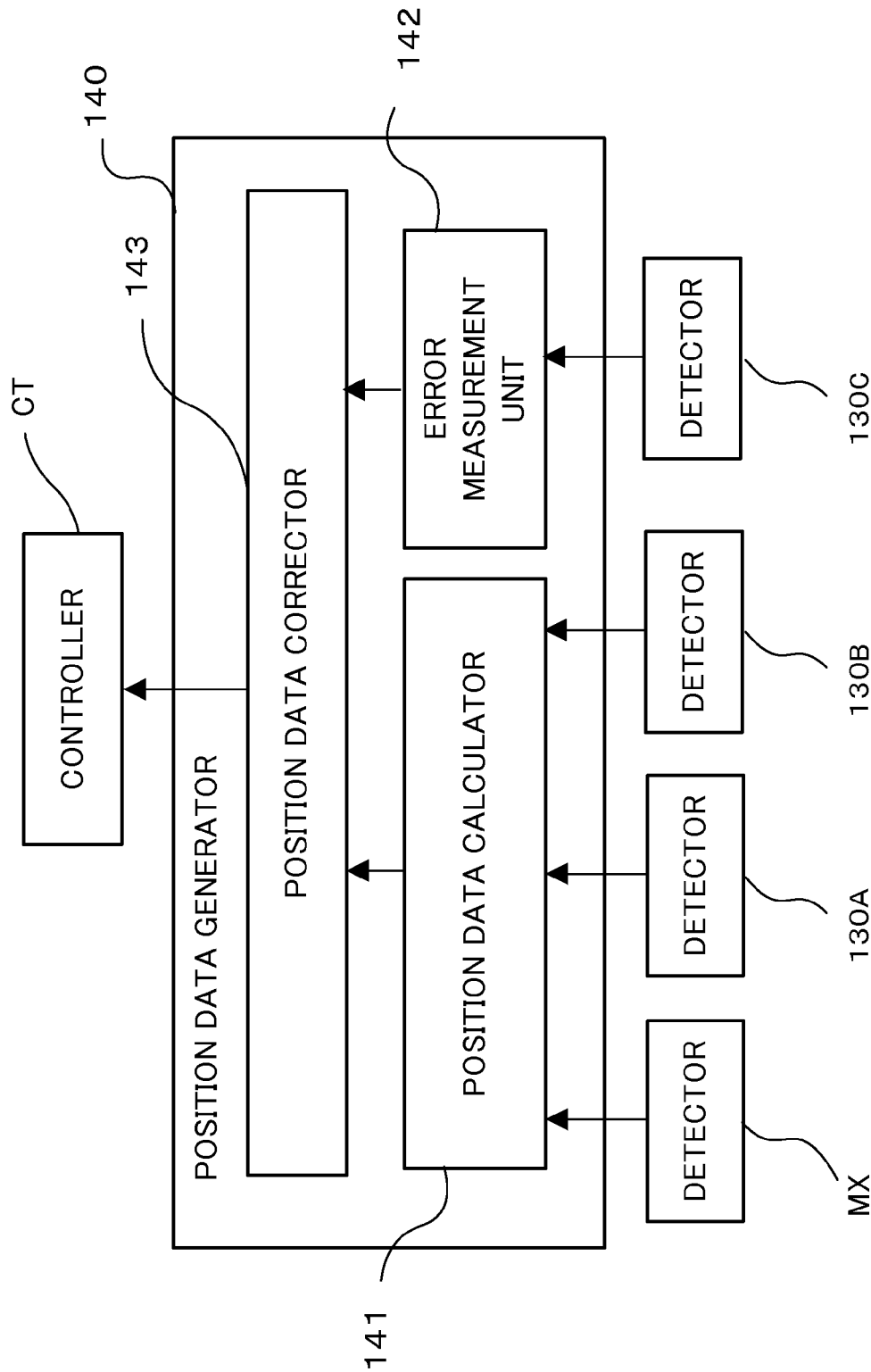
FIG. 7 is an explanatory diagram for describing a position data generator included in the encoder according to the first embodiment of the present invention.
Figure 8:
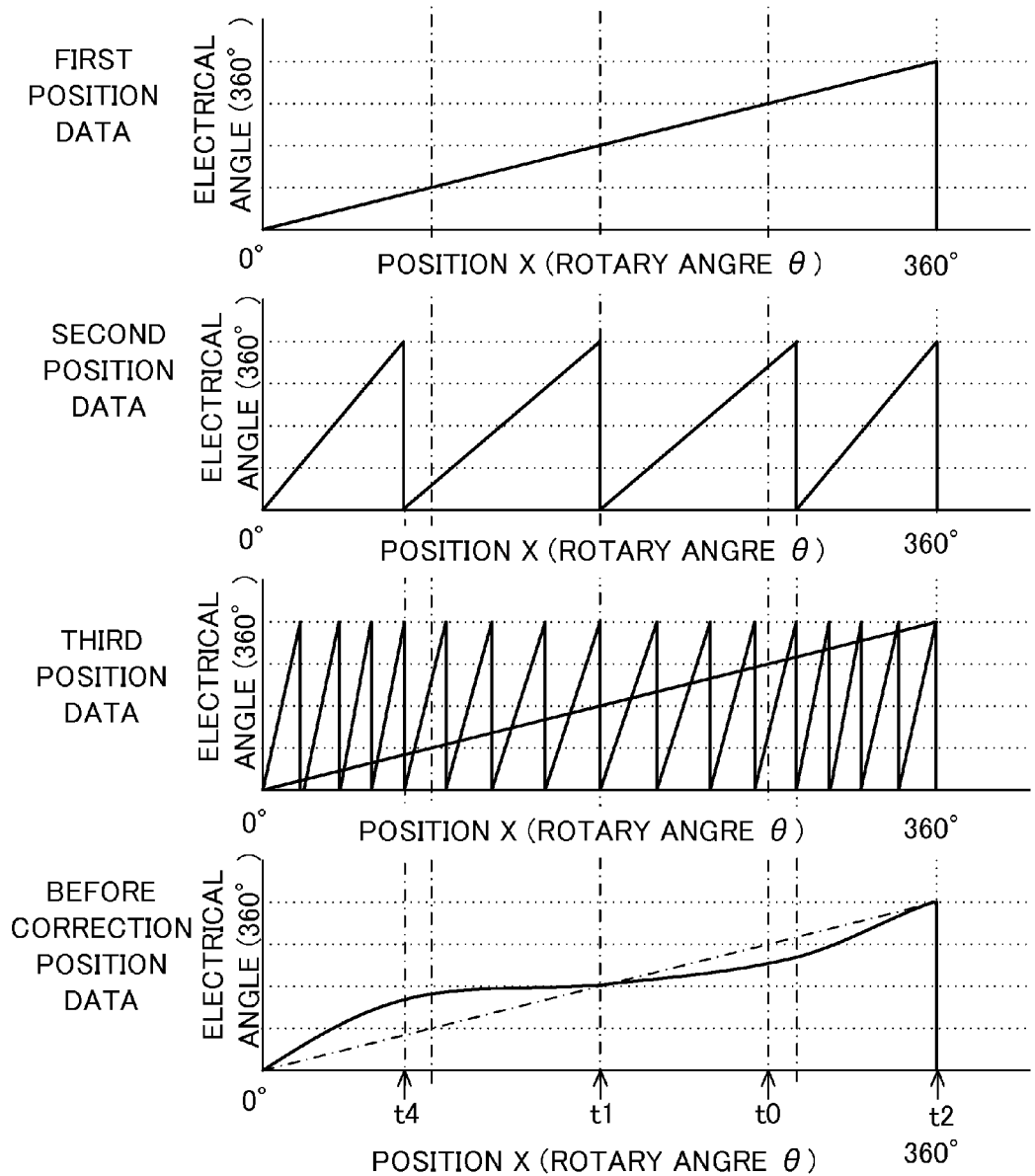
FIG. 8 is an explanatory diagram for describing the position data generator included in the encoder according to the first embodiment of the present invention.
Figure 9:
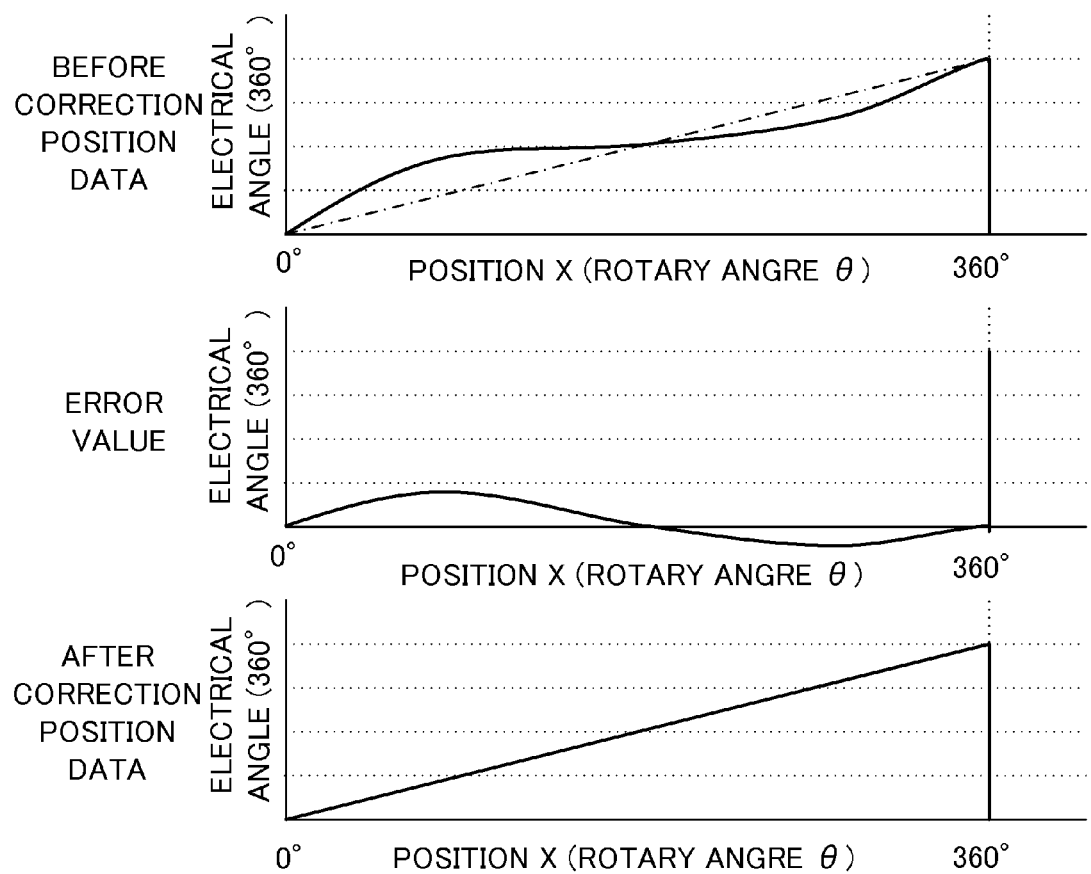
FIG. 9 is an explanatory diagram for describing the position data generator included in the encoder according to the first embodiment of the present invention.

Next, with reference to FIG. 2 and FIGS. 7 to 9, a description will be given of the position data generator 140 which is the final constituent of the encoder 100. FIGS. 7 to 9 are explanatory diagrams for describing the position data generator included in the encoder according to the present embodiment.

The position data generator 140 obtains the 1X detection signal, the first incremental detection signal, the second incremental detection signal, and the eccentricity detection signal, each of which is a sinusoidal signal, from the detector 130X and the detectors 130A to 130C, respectively. The position data generator 140 specifies the absolute position x of the motor M based on the signals, and outputs position data representing the position x.

To this end, the position data generator 140 includes, as shown in FIG. 7, a position data calculator 141, an error measurement unit 142 and a position data corrector 143. In the following, an exemplary position x specifying process carried out by the position data generator 140 will be described more specifically.

In the present embodiment, as has been described above, the first incremental detection signal, the second incremental detection signal and the eccentricity detection signal obtained by the position data generator 140 each include two periodic signals of the A-phase periodic signal and the B-phase periodic signal which are 90° out of phase from each other.

On the other hand, the detector 130X also includes two (at least two) magnetic angle sensors that detect magnetic field directions shifted by 90° from each other, and that output two 1X detection signals of an identical period which are out of phase by 90° in electrical angle from each other (which are also referred to as the A-phase 1X detection signal and the B-phase 1X detection signal), respectively, similarly to the periodic signals mentioned above. Note that, the 1X detection signals also are sinusoidal electric signals which are repeated per revolution of the disk 110 and, therefore, they are periodic signals. However, because of the difference in the principle of detection and the like, for ease of explanation, a distinction is drawn between the 1X detection signal and the first incremental detection signal, the second incremental detection signal and the eccentricity detection signal.

The position data calculator 141 obtains, as to each of the 1X detection signal, the first incremental detection signal and the second incremental detection signal, two sinusoidal signals of A- and B-phases. Then, the position data generator 140 converts the two sinusoidal signals of A- and B-phases, for each of the 1X detection signal, the first incremental detection signal and the second incremental detection signal, into the position data representing an electrical angle $\phi$ for each of the detection signals, to generate first to third position data pieces that monotonously increase in each period. It is to be noted that the position data generating method carried out by the position data generator 141 is not particularly limited. Examples of the position data generating method may include, for example: performing the arctan calculation using the division results of the two sinusoidal signals of A- and B-phases to obtain the electrical angle $\phi$; converting the two sinusoidal signals into the electrical angle $\phi$ using a tracking circuit; and specifying the electrical angle $\phi$ associated with the values of A- and B-phase signals based on a previously prepared table. Here, it is desirable that the position data calculator 141 firstly have the two sinusoidal signals of A- and B-phases undergo analog to digital conversion for each of the detection signals, and then have the two converted digital signals undergo multiplication processing, to thereby improve resolution, and thereafter, the position data calculator 141 performs the position data generation. Exemplary first to third position data pieces calculated by the position data calculator 141 are shown in FIG. 8. In FIGS. 8 and 9, the profile of the position data pieces and the like represents the profile when the disk 110 completes one revolution at a constant rate.

As shown in FIG. 8, the first position data is generated based on the 1X detection signal produced by the 1X detection mechanism structured with the magnet MG and the like, and it's electrical angle $\phi_x$ (0° to 360°) monotonously increases (or decreases) once per revolution of the disk 110 (i.e., periodicity $m_x=1$). On the other hand, the second position data is generated based on the first incremental detection signal produced by the first incremental detection mechanism structured with the track TA and the like and, in the present embodiment, it's electrical angle $\phi_A$ (0° to 360°) monotonously increases (or decreases) four times per revolution of the disk 110 (i.e., periodicity $m_A=4$). The third position data is generated based on the second incremental detection signal produced by the second incremental detection mechanism structured with the track TB and the like and, in the present embodiment, it's electrical angle $\phi_B$ (0° to 360°) monotonously increases (or decreases) sixteen times per revolution of the disk 110 (i.e., periodicity $m_B=16$). In a case where the pitch is set to establish the relationship "$p_{G1}=2\times p_L=p_{G2}$" as in the present embodiment, in order to realize such resolution, the number of the slits $n_A$ to $n_C$ of the tracks TA to TC are respectively set to four, sixteen, and sixty-four.

However, this is merely an example, and the number of the slits $n_A$ to $n_C$ of tracks TA to TC, respectively, are not particularly limited. The number of the slits $n_A$ to $n_C$ of the tracks TA to TC, respectively, may be set as appropriate for the purpose of obtaining the periodic signals of desired periodicity $m_A$ to $m_C$, which periodic signals are produced from the tracks TA to TC, respectively. It is to be noted that, as in the present embodiment, in a case where the pitch is set to establish the relationship "$p_{G1}=2\times p_L=p_{G2}$", the following relationship is satisfied: "$m_A=n_A$, $m_A=n_A$, $m_A=n_A$". When the pitch is set to establish the relationship "$p_{G1}=1\times p_L=p_{G2}$", the following relationship is satisfied: "$m_A=2\times n_A$, $m_A=2\times n_A$, $m_A=2\times n_A$". Based on these relationships, the number of the slits $n_A$ to $n_C$ commensurate to the desired periodicity $m_A$ to $m_C$ can be determined. Further, in the present embodiment, for ease of explanation, what is shown is a case where the periodicity $m_A$ and $m_B$ of the signals detected by the first and second incremental detection mechanisms are set to 4 and 16, respectively. On the other hand, it is desirable that the periodicity $m_A$ and $m_B$ are set to greater values.

The pieces of first to third position data represent the positions x by the resolution commensurate to the periodicity $m_X$ to $m_B$. Accordingly, the third position data is higher in resolution than the second position data, and the second position data is higher in resolution than the first position data.

Accordingly, the position data calculator 141 calculates the absolute position x whose resolution is approximately as high as that of the third position data whose resolution is the highest, based on the first to third position data pieces. While the resolution of the first position data is relatively low, it represents 1X, that is, the absolute position. The position data calculator 141 is capable of calculating the absolute position x which is an absolute position but whose resolution as high as the position represented by the second position data, by superimposing the relatively high resolution position represented by the second position data on the absolute position represented by the first position data. Then, in the similar manner, the position data calculator 141 is capable of calculating the absolute position x which is an absolute value but whose resolution is as high as the position represented by third position data, by superimposing the position represented by the third position data whose resolution is even higher than the absolute position x calculated based on the second position data, on the absolute position x calculated based on the second position data. In other words, as shown in FIG. 8, the position data calculator 141 converts the position represented by the third position data whose resolution is the highest into the absolute position x by successively using the second position data and the first position data. Such a method of specifying a high resolution absolute position based on a plurality of position data pieces which are different from one another in resolution is also referred to as the "cumulative scheme".

Meanwhile, FIG. 8 shows the position data pieces in a case where the disk 110 is eccentric. In this case, for example, the curved slits of the first incremental detection mechanisms based on which the second position data is generated and that of the second incremental detection mechanism based on which the third position data is generated are different in curvature C. Being different from radial slits, such curved slits are different in curvature from one another. Therefore, the detection signals not always contain an error as to an eccentricity at an identical timing. The deviation in the timing of the contained error results in the asynchronicity between the second position data and the third position data. Such asynchronicity may greatly influence the absolute position calculation result in a case such as the cumulative scheme noted above is employed in calculating the absolute position which is based on use of a plurality of tracks T.

On the other hand, the detectors 130A and 130B according to the present embodiment are disposed to establish a positional relationship in which the tangents of the curved slits are in parallel to each other. In a case where the detectors 130A and 130B are disposed to establish such a positional relationship, for example when an eccentricity occurs in the tangents LINEA and LINEB direction in FIG. 3 (time points t1 and t2 in FIG. 8), the effect of the eccentricity is not contained in the detection signals. On the other hand, when an eccentricity occurs in the direction perpendicular to such a direction (time points t3 and t4 in FIG. 8), the effect of the eccentricity is contained in the detection signals at an identical timing, because of the tangent LINEA and the tangent LINEB being parallel to each other. As a result, as shown in FIG. 8, the position data calculator 141 can detect, as the position data prior to correction, the absolute position x of high resolution, which contains an error due to the eccentricity of the disk 110 but is free of asynchronicity.

On the other hand, the error measurement unit 142 obtains the error detection signal from the error detection mechanism including the concentric slits. The error detection signal has, in a case where the disk 110 is eccentric, a period $m_C$ commensurate with the amount of eccentricity. Then, based on the error detection signal, the error measurement unit 142 calculates the error attributed to the eccentricity. The error value calculated by the error measurement unit 142 is shown in FIG. 9. Note that, the conversion of the error detection signal into the error value carried out by the error measurement unit 142 is performed similarly to the conversion processing carried out by the position data generator 141 to obtain the first to third position data pieces and, therefore, a detailed description thereof is not repeated herein.

As shown in FIG. 9, the position data corrector 143 subtracts (or adds) the error value calculated by the error measurement unit 142 from (or to) the absolute position data calculated by the position data calculator 141, to thereby correct the error. Then, the position data corrector 143 outputs the position data representing the absolute position x having its error reduced and therefore being accurate, and of high resolution thanks to the cumulative scheme, to the controller CT.

1-3. Operation of Servo Unit According to First Embodiment

Next, a description will be given of operation of the servo unit SU according to the present embodiment. Because the operation and effect of the other structures has already been given in each section, the description will proceed not repeating the foregoing description as appropriate.

The controller CT obtains a higher-level control signal from a higher-level controller or the like, and obtains the position data representing the absolute position x of the motor M from the encoder 100. Then, the controller CT generates a control signal based on the higher-level control signal and the position data, and outputs the control signal to the motor M.

As a result, the motor M rotates the shaft SH1 based on the control signal. Then, the shaft SH2 to which the shaft SH1 is associated rotates the disk 110 of the encoder 100 coupled via the shaft SH3. On the other hand, the detectors 130X, 130A and 130B respectively detect the 1X detection signal, the first incremental detection signal, and the second incremental detection signal, in accordance with the rotation of the disk 110. The detector 130C detects the eccentricity detection signal in accordance with the eccentricity occurring due to the rotation of the disk 110. Then, the detectors 130X, 130A to 130C output the detection signals to the position data generator 140.

The position data calculator 141 of the position data generator 140 converts the 1X detection signal, the first incremental detection signal, and the second incremental detection signal into the first to third position data pieces, respectively, and based on the first to third position data pieces, calculates the absolute position x having the resolution approximately as high as the third position data. On the other hand, the error measurement unit 132 converts the eccentricity detection signal into the error value. Then, the position data corrector 143 corrects the absolute position x calculated by the position data calculator 141 based on the error measured by the error measurement unit 132, and outputs the high-precision accurate absolute position x to the controller CT.

Thus, the encoder 100 according to the present embodiment is capable of detecting the high-precision absolute position x of the motor M to supply it as the position data to the controller CT. Hence, the servo unit SU can control the position x of motor M highly precisely based on the high-precision absolute position x.

1-4. Manufacturing Method of Encoder According to First Embodiment

In the foregoing, the description has been given of the encoder and the like according to the first embodiment of the present invention.

Figure 10:
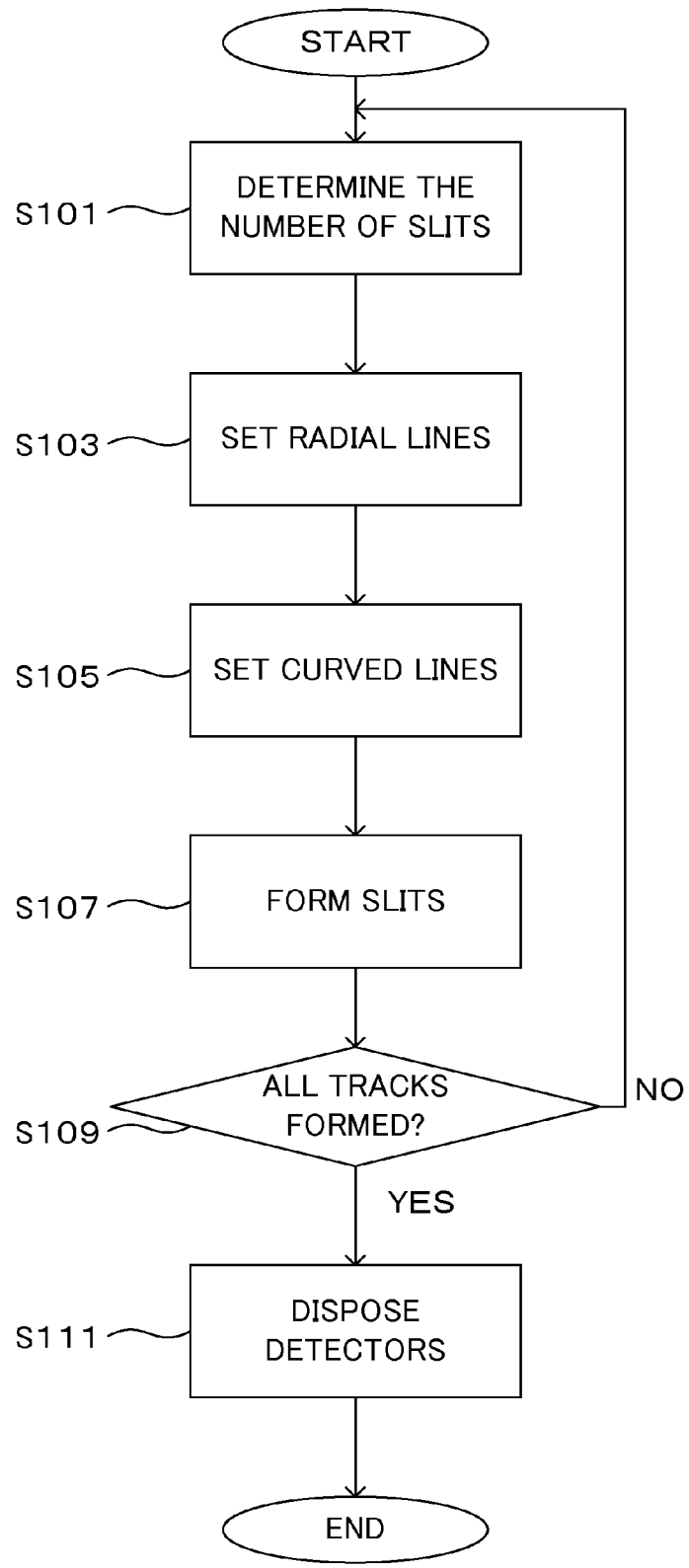
FIG. 10 is an explanatory diagram for describing a manufacturing method of the encoder according to the first embodiment of the present invention.

Next, with reference to FIG. 10, a description will be given of a manufacturing method of the encoder 100 according to the present embodiment. FIG. 10 is an explanatory diagram for describing the manufacturing method of the encoder according to the present embodiment. Here, the description will chiefly be given of the formation of the curved slits such as the tracks TA and TB.

As shown in FIG. 10, in the manufacturing method of the encoder 100, firstly, step S101 is processed. In step S101 (an exemplary step of determining the number of slits), as to one track T in the disk 110, the periodic signal having the periodicity m desired to be obtained per revolution is determined in accordance with the resolution desired to be obtained from the track T. Then, in accordance with the period, the number of slits n to be formed in the track T is set. Then, the process proceeds to step S103.

In step S103 (an exemplary step of setting radial lines), as shown in FIG. 6, the radial lines LINE1 as many as the number determined in step S101 are equiangularly set about the disk center O (the rotary axis AX). Then, the process proceeds to step S105.

In step S105 (an exemplary step of setting curved lines), the curvature C is set such that the pitch $p_L$ of the slits SL assumes a desired value. Then, a plurality of radial lines LINE1 set in step S103 are curved with the set curvature C in an identical circumferential direction, whereby a plurality of curved lines LINE2 are set.

It is to be noted that, in this step S105, the curvature C is set such that the pitch $p_L$ of the slits SL of the to-be-formed track T (an exemplary one track) becomes equal to the pitch $p_L$ of the slits SL of the already formed track T or that of the to-be-subsequently-formed track T (an exemplary other track T). After the step S105, the process proceeds to step S107.

In step S107 (an exemplary step of forming the slits), along a plurality of curved lines LINE2 set in step S105, a plurality of slits SL of a prescribed width w is formed in the track T. Then, the process proceeds to step S109.

In step S109, whether or not the slits SL are formed as to all the desired plurality of tracks T is checked. Then, when there is any track T where the slits SL are not formed yet, the processes following step S101 are repeated. On the other hand, when the slits SL are formed for every track T, the process proceeds to step S111.

In step S111 (an exemplary step of disposing the detectors), the detectors 130A to 130C are disposed so as to face the slits SL at the positions where the tangents LINEA to LINEC of respective slits SL becomes parallel to one another at positions where the detectors 130A to 130C face the slits SL. Here, the detectors 130 are disposed, as to each of the two or more tracks T which are equivalent to each other in pitch $p_L$, such that the gap g between the rotary grating L and the fixed gratings G1 and G2 is constant.

It is to be noted that, concurrently with or before or after those processes, a process of disposing the 1X detection mechanism, a process of coupling the shaft SH2 to the disk 110, a process of coupling the detectors 130 to the position data generator 140, a process of storing the structures in a case and holding the same fixedly or rotatably and the like are carried out, so as to complete the encoder 100. However, a detailed description of such processes is omitted herein.

1-5. Exemplary Effect Achieved by Encoder System of First Embodiment

In the foregoing, the description has been given of the encoder, the servo unit and the manufacturing method of the encoder according to the first embodiment of the present invention.

With the encoder 100 and the like according to the present embodiment, a plurality of slits SL of at least one track T (the first track) are formed as the curved slits extending along the curved line LINE2. The pitch $p_L$ of the curved slits is adjustable by adjusting the curvature C of the curved line LINE2, without the necessity of changing the formation position of the track T, the number of slits n included in the track T, and the like. Hence, flexibility in designing, development and the like can be improved.

Further, as to the curved slits employed in the encoder 100 and the like, the length of every slit SL can be extended by the amount commensurate to its curvature C. As a result, the change amount of the pitch $p_L$ of the slits SL in the slit formation direction can be reduced. Which means, the pitch $p_L$ of the slits SL can be unified in the slit formation direction, that is, the slits SL being the curved slits can approximate parallel slits. On the other hand, the encoder 100 according to the present embodiment uses the diffraction interference optical systems employing such curved slits. In each diffraction interference optical system, the closer the slits SL approximate the parallel slits, the greater an improvement in the S/N ratio and the like of the detection signals becomes, whereby the detection precision can be improved. Hence, in the encoder 100 according to the present embodiment, use of such curved slits makes it possible to approximate a plurality of slits SL to the parallel slits. Consequently, it becomes possible to improve the S/N ratio and the like of the detection signals, and to improve the detection precision.

Hence, with the encoder 100 according to the present embodiment, it becomes possible to raise the limitation in designing and development in structuring the diffraction interference optical systems such that the designing and development and the like are adopted to easier manufacture, while improving the detection precision using the diffracted interfering light.

Such an effect is particularly effective in a case where the track radius r is set to a great value, or where the periodicity $m_L$ of each periodic signal is set to a small value. That is, normally, in structuring a diffraction interference optical system, a greater track radius r necessitates the pitch $p_L$ of the slits SL of a sufficiently small value in order for the diffraction interference optical system to be structured. This inevitably invites an increase in the number of slits n, which brings about an increase in the periodicity m of the periodic signals corresponding to the number of slits n. On the other hand, similarly, a smaller periodicity m necessitates the track radius r of a small value. However, as has been described in the foregoing, with the encoder 100 according to the present embodiment, adjustment of the curvature C allows the number of slits n or the track radius r to be adjusted independently of each other. Hence, the limitation on the designing and development can drastically be raised, whereby miniaturization or the like can be realized.

On the other hand, with the encoder 100 according to the present embodiment, by employing at least one track T which is formed with the curved slits, at least two tracks T can be equalized to each other in terms of the pitch $p_L$. As a result, the gap g between each of the detectors 130 (i.e., the masks 120) and corresponding tracks T can be equalized. Hence, the diffraction interference optical systems as to those tracks T can substantially identically be designed, developed, and subjected to any other procedures, and every gap g between each of the detectors 130 and corresponding one of the tracks T can be adjusted at once. Thus, designing, development, manufacture and other procedures can drastically be facilitated.

Further, with the encoder 100 according to the present embodiment, the detectors corresponding to their respective tracks T are disposed to establish the positional relationship in which the tangents (tangents LINE1 to LINE3) of the slits at the position where the detectors face their respective tracks T are in parallel to one another. Accordingly, it becomes possible to reduce the time difference in the occurrence of the eccentricity errors (asynchronicity) among the detection signals due to the slits being curved. Accordingly, the encoder 100 according to the present embodiment is capable of calculating an accurate absolute position without being influenced by the asynchronicity associated with use of the curved slits.

Further, the encoder 100 measures the eccentricity errors that synchronously occur in the detection signals by the concentric slits, and based on the error value, it corrects the absolute position. Accordingly, the encoder 100 is not only being free of asynchronicity, but is capable of reducing the errors attributed to eccentricity themselves, and calculating more accurate absolute position.

1-6. Example of Encoder According to First Embodiment

Now, in order to further clarify the effect of the encoder 100 and the like according to the present embodiment, Example based on the encoder 100 according to the present embodiment was compared against Comparative Example based on an encoder which is structured differently from that according to the present embodiment, and the effect noted above is described in further detail.

Note that, in this section, for ease of explanation, only one track T is formed on the disk 110, and comparison is made as to the operation and effect achieved by the one track T. However, it goes without saying that the encoder 100 and the like according to the present Example can achieve, in addition to the operation and effect and the like described in this section, the other operation and effect as described in the foregoing embodiment.

Figure 11:
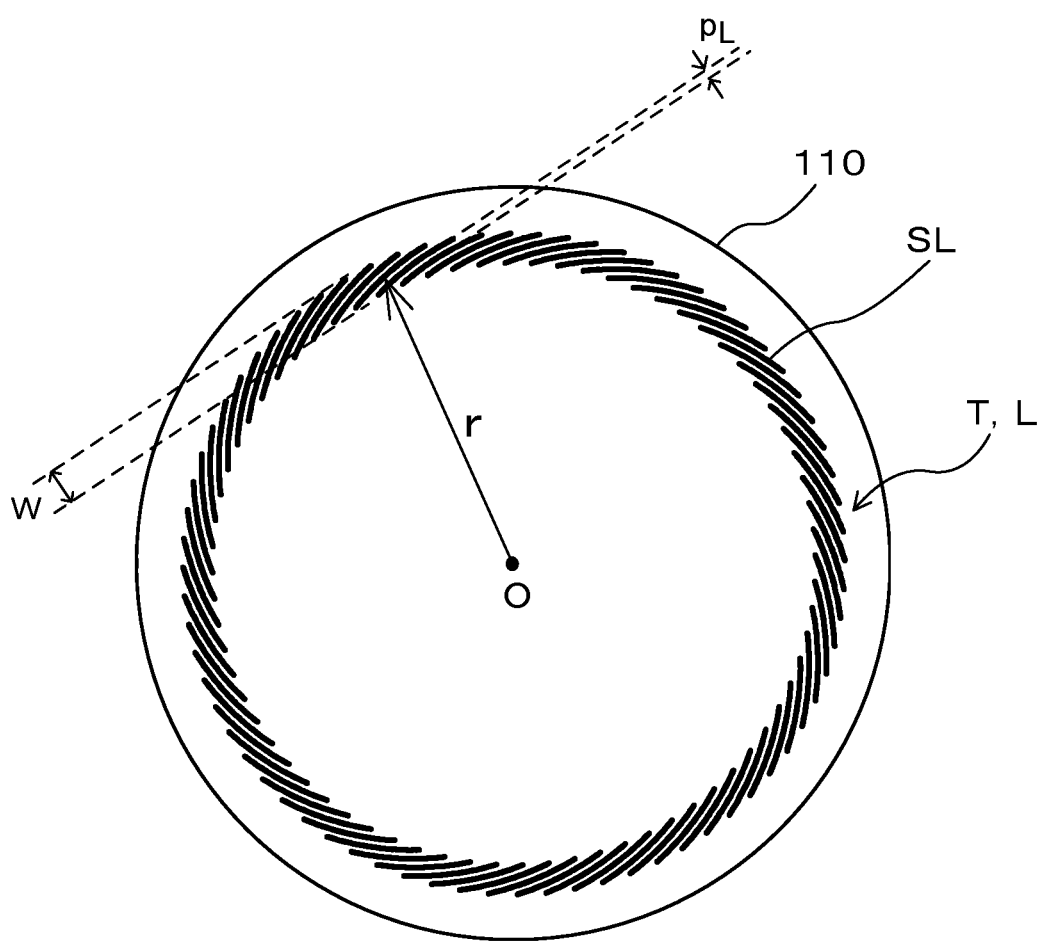
FIG. 11 is an explanatory diagram for describing a disk included in an encoder according to Example of the first embodiment of the present invention.

In making a comparison, as the encoder 100 according to Example of the present embodiment, the following parameters are set as to the disk 110: the radius (track radius) r as measured at the center in the width w direction of the track T was set to 8 mm; and the track width w (i.e., the radial length) was set to 0.5 mm. Then, in the track T, 512 lines of curved slits SL of the rotary grating T of the disk 110 were formed along the curved lines LINE2, such that the pitch $p_L$ between the slits SL becomes 20 μm where the track radius r=8 mm. Here, the width of each of the slits SL was set half as great as the pitch $p_L$, which is 10 μm. Then, the fixed gratings G1 and G2 were formed at a pitch of 40 μm in the tangential direction of the curved rotary grating L so as to satisfy the relationship "$p_{G1}=2\times p_L=p_{G2}$", to thereby obtain 512/revolution as the periodicity m of each periodic signal per revolution. In this manner, the encoder according to Example was structured. It is to be noted that, because an LED whose wavelength is λ=880 nm is employed as the light source, the gap g being the distance between the fixed gratings G1 and G2 and the rotary grating L was set to 0.9 mm, which is a value twice as great as $g=p_L^2/\lambda$. The disk 110 of the encoder according to Example is shown in FIG. 11.

Figure 12:
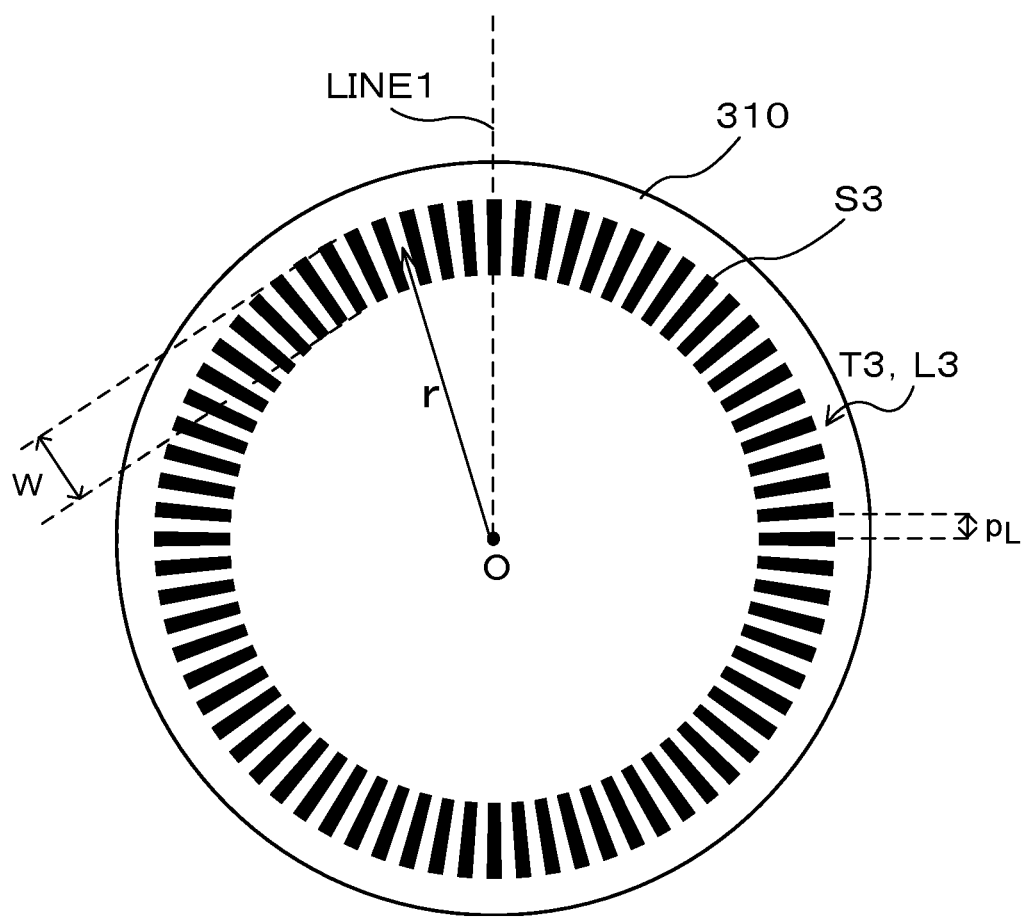
FIG. 12 is an explanatory diagram for describing a disk included in an encoder according to Comparative Example 1.
Figure 13:
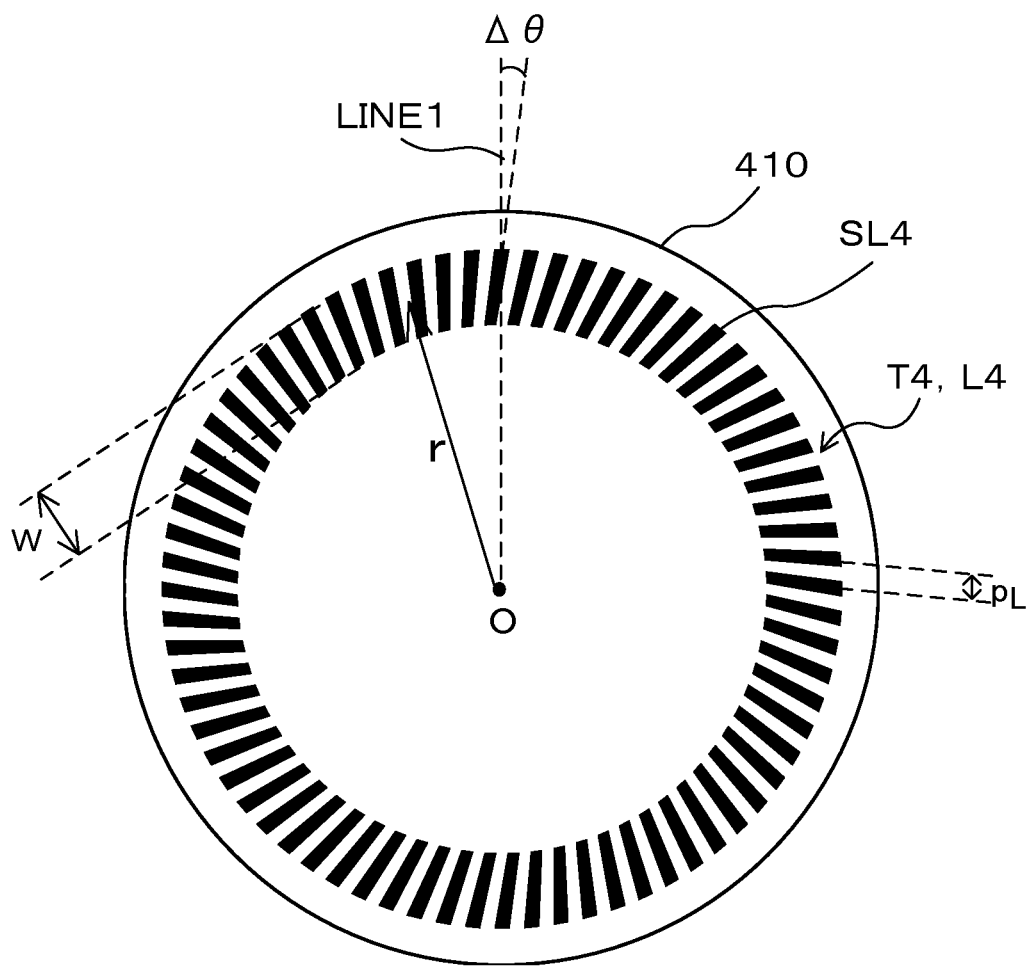
FIG. 13 is an explanatory diagram for describing a disk included in an encoder according to Comparative Example 2.
Figure 14:
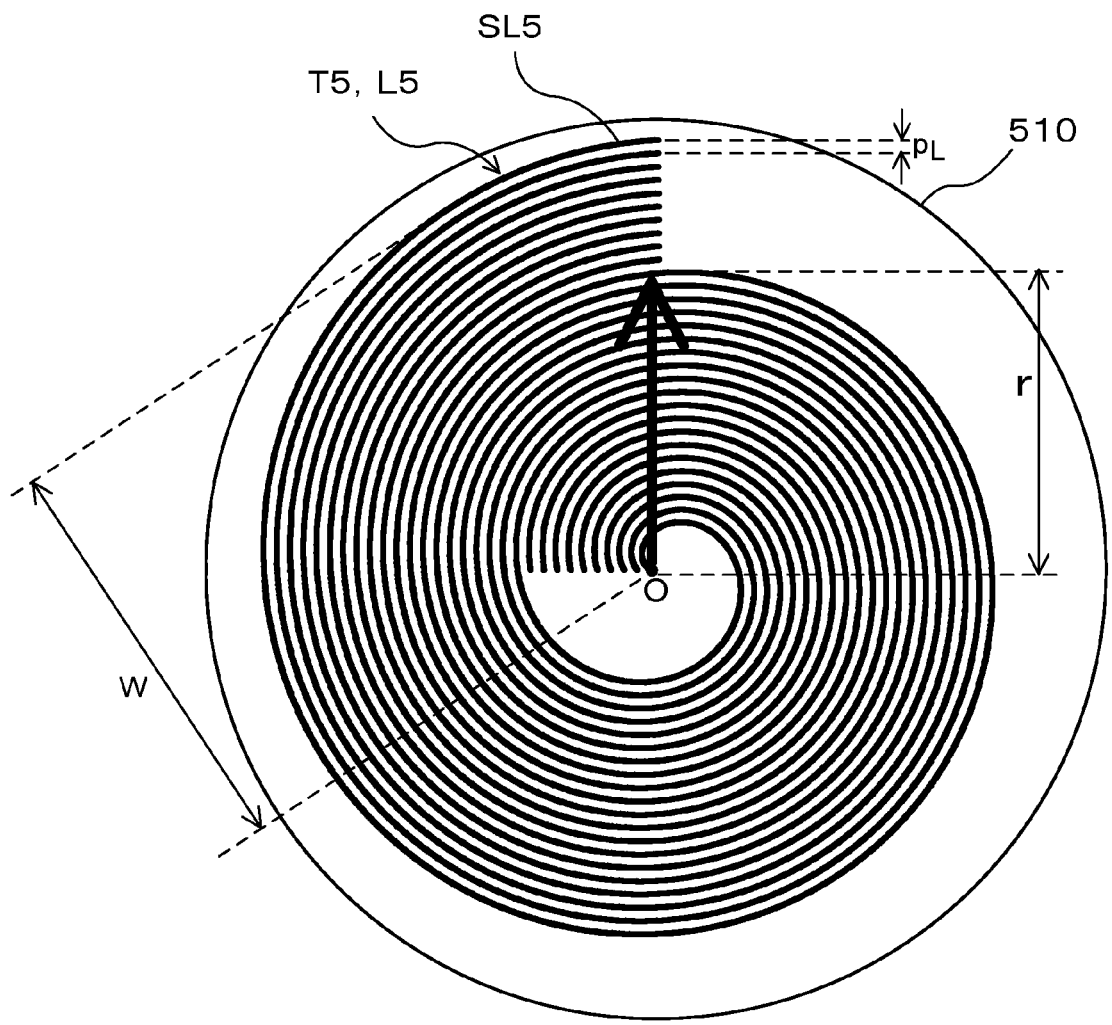
FIG. 14 is an explanatory diagram for describing a disk included in an encoder according to Comparative Example 3.

On the other hand, in order to clarify the operation and effect and the like of the encoder according to Example of the present embodiment, the following encoders according to Comparative Examples were prepared, with which similar two periodic signals whose periodicity m=512 are obtained from similar tracks T3 to T5 (r=8 mm, w=0.5 mm): an encoder (Comparative Example 1) including a disk 310 having solely radial slits not being curved; an encoder (Comparative Example 2) including a disk 410 having solely tilted slits, which are obtained by tilting radial slits without curving the same, such that each of the slits forms a prescribed angle Δθ relative to the circumferential direction; and an encoder (Comparative Example 3) including a disk 510 having solely multiple spiral slits, as is disclosed in Japanese Unexamined Patent Application Publication No. 6-347293. The disks 310 to 510 of the encoders according to Comparative Examples 1 to 3 are shown in FIGS. 12 to 14, respectively.

More specifically, in order to unify the setting condition of the tracks T3 to T5 and the setting condition of the gap g with those of Example, in Comparative Examples 1 to 3 also, the width of each of the slits SL was set half as great as the pitch p; the track radius r was set to 8 mm; the track width w is set to 0.5 mm, and the gap g was set to 0.9 mm. Further, in order to obtain the periodic signals of identical periodicity (m=512/revolution), in Comparative Examples 1 to 3 also, 512 lines of slits SL3 to SL5 were formed in each track T in each manner.

That is, in Comparative Example 1, 512 lines of slits SL3 of rotary grating L were formed along radial lines LINE1 drawn at equiangular intervals from the disk center O.

In Comparative Example 2, instead of curving the radial lines LINE1 in Comparative Example 1, the radial lines LINE1 were tilted by Δθ=0.35 degrees in the circumferential direction of the track T, along which slits SL4 were formed.

In Comparative Examples 1 and 2, the fixed gratings G1 and G2 are formed as the parallel slits, and are disposed to be substantially in parallel to at least part of the rotary gratings L3 and L4.

On the other hand, in Comparative Example 3, 512 lines of slits SL5 were formed as being spirally wound about the disk center O at least one turn, each within the track T5. However, in FIG. 14, the 512 lines of the slits SL5 are schematically shown in a simplified manner as appropriate. In Comparative Example 3, the fixed gratings G1 and G2 are formed as the parallel slits, and are disposed in parallel to the tangents of the spiral of the disk 510.

As shown in Table 1, in a case where the track radius r is set to 8 mm as to Comparative Examples 1 to 3 formed in this manner, the pitch $p_L$ is 98 μm in Comparative Examples 1 and 2, and is 0.98 μm in Comparative Example 3.

In Comparative Examples 1 and 2, because the pitch $p_L$ assumes the great value of 98 μm, it is difficult to structure an encoder using the diffraction interference phenomenon described in the foregoing. On the other hand, in Comparative Example 3, because the pitch $p_L$ assumes the small value of 0.98 μm, high manufacture precision is demanded for the rotary grating L and the fixed gratings G1 and G2, whereby the manufacture becomes difficult. Additionally, the pitch $p_L$ in each of Comparative Examples cannot be set to the optimum value (20 μm) for the gap g.

In contrast, in Example, the pitch $p_L$ can be adjusted to assume the optimum value 20 μm for the gap g by adjusting the curvature C and the like.

Here, the pitch $p_L$ in Comparative Examples 1 and 2 establishes the following relationship between the periodicity m: "$m=2\pi r/p_L$". On the other hand, while the pitch $p_L$ in Comparative Example 3 establishes the relationship "$m \leq 2\pi r/p_L$" between the periodicity m, it also establishes the relationship "$p_L=2w/(q\times m)$" where q is the number of turns of the spiral. That is, when it is desired to change the periodicity m while keeping the track radius r and the like at a constant value, in Comparative Examples 1 to 3, this essentially necessitates changing the value of the pitch $p_L$ of the rotary gratings L3 to L5 and, consequently, necessitates changing the optimum gap g for the pitch $p_L$ also.

In contrast thereto, while the $p_L$ of Example establishes the relationship "$m \leq 2\pi r/p_L$" between the periodicity m, the pitch $p_L$ can freely be set within a range satisfying this relationship, by changing the curvature C of the rotary grating L. Hence, the periodicity m can be changed with the pitch $p_L$ of a constant value and, eventually, with the gap g of a constant value.

Provided that the same pitch $p_L$ as in Example is employed in Comparative Examples 1 to 3 (i.e., $p_L$=20 μm), in order to obtain the periodic signals of 512 period by 512 lines of the slit SL3 to SL5, in Comparative Examples 1 and 2, the track radius r must be set to 1.63 mm. In Comparative Example 3, the track radius r also must be set to at least 10.24 mm such that the track width becomes at least 10.24 mm. Hence, in this case, disposition and the like of the fixed gratings G1 and G2 and the light receiver 132 must inevitably be changed. Further, in this case, in a case where the track radius r assumes the extremely small value of 1.63 mm as in Comparative Examples 1 and 2, the angle of divergence between the slits becomes excessively great, that is, the change rate of the pitch $p_L$ becomes excessively great, whereby it becomes difficult to use the diffraction interference phenomenon. On the other hand, in a case where the track radius r assumes the great value of 10.24 m as in the Comparative Example 3, the disk 110 of a large size is required, whereby an increase in the size of the encoder itself is invited.

The following is the result of comparison between the periodic signals obtained by Example and the periodic signals obtained by Comparative Examples 1 to 3. That is, in Comparative Examples 1 and 2 having the track radius r maintain the value 8 mm, the pitch $p_L$ assumes the extremely great value of 98 μm, and periodic signals based on the diffraction interference optical system cannot be obtained (N/A). In a case where the pitch $p_L$ is unified to the value 20 μm, with Comparative Example 1 employing the radial slits, the change rate of the pitch $p_L$ is great, and the periodic signals are greatly deviated from sinusoidal signals, exhibiting poor signal characteristic (Poor); with Comparative Example 2 employing the tilted slits, though the change rate of the pitch $p_L$ is reduced due to the tilted slits and the periodic signals somehow resembles sinusoidal waves, the periodic signals exhibit insufficient signal characteristic (Mediocre).

In Comparative Example 3, having the track radius r maintain the value 8 mm, the slit pitch $p_L$ assumes the extremely small value of 0.98 μm, and the optimum gap results in multiples of 2 µm. That is, every change by 2 µm in the gap, the output varies (Poor). Further, when the pitch $p_L$ is unified to the value 20 µm, the multiple spiral slits and the fixed grating G2 which is formed at constant pitch in the radius direction agree with each other in terms of shape only in a small area, and it is difficult to obtain sufficient signal characteristic (Mediocre).

In contrast thereto, in Example, because the slits SL are curved, the slits SL become parallel to one another in a great area, and the periodic signals become substantially sinusoidal waves. Thus, very excellent signal characteristic can be realized (Excellent).

[Table 1]

TABLE 1

|  | Example | Comparative Example 1 | | Comparative Example 2 | | Comparative Example 3 | |
| --- | --- | --- | --- | --- | --- | --- | --- |
| Periodicity m (/rev) | 512 | 512 | | 512 | | 512 | |
| Track radius r (mm) | 8 | 8 | 1.63 | 8 | 1.63 | 8 | 10.24 or greater |
| Track width w (mm) | 0.5 | 0.5 | 0.5 | 0.5 | 0.5 | 0.5 | 10.24 or greater |
| Slit number n (line) | 512 | 512 | | 512 | | 512 | |
| Slit shape | Curved and tilted | Radial | | Non-curved and tilted | | Multiple spiral | |
| Slit pitch $p_L$ (µm) | 20 | 98 | 20 | 98 | 20 | 0.98 | 20 |
| Slit formation direction | In tangential direction of rotary slit | In parallel to rotary slit | | In parallel to rotary slit | | In circumferential direction of disk | |
| Gap g (mm) | 0.9 | 0.9 | 0.9 | 0.9 | 0.9 | 0.9 | 0.9 |
| Optimum gap | Multiples of 0.9 mm | Multiples of 21.9 mm | Multiples of 0.9 mm | Multiples of 21.9 mm | Multiples of 0.9 mm | Multiples of 0.002 mm | Multiples of 0.9 mm |
| Uniformness of pitch $p_L$ for radius r | $p_L$ gradually widens from inner diameter side toward outer diameter side | $p_L$ widens from inner diameter side toward outer diameter side | | $p_L$ widens from inner diameter side to outer diameter side | | $p_L$ is at equal interval for r | |
| Setting of periodicity m | Arbitrary m can be set by adjusting C within m $\leq$ 2πr/$p_L$ | Periodicity m is determined by m = 2πr/$p_L$ (m being dependent on $p_L$) | | Periodicity m is determined by m = 2πr/$p_L$ (m being dependent on $p_L$) | | m $\leq$ 2πr/$p_L$, where m is determined by $p_L$ = 2w/(q × m) (m being dependent on $p_L$) | |
| Relationship between track radius r and rotary slit pitch $p_L$ | Arbitrary combination of r and $p_L$ can be realized by adjustment of C | $p_L$ increases when r is maintained r decreases when $p_L$ is maintained | | $p_L$ increases when r is maintained r decreases when $p_L$ is maintained | | $p_L$ extremely decreases when r is maintained r increases when $p_L$ is maintained | |
| Signal characteristic | Excellent | N/A | Poor | N/A | Mediocre | Poor | Mediocre |

As shown in Table 1, with the encoder according to Example, adjustment of the pitch $p_L$ can be carried out with ease, and additionally, very excellent signal characteristic can be realized, as compared to the encoders according to Comparative Examples 1 to 3.

Obviously, numerous modifications and variations of the present invention are possible in light of the above teachings. It is therefore to be understood that within the scope of the appended claims, the invention may be practiced otherwise than as specifically described herein.

For example, in the embodiment, the description has been given of the case where curved slits are employed for both the first incremental detection mechanism and the second incremental detection mechanism. On the other hand, the present invention is not limited to such a case. That is, so long as at least one detection mechanism has the curved slits, the other detection mechanism may have radially formed radial slits. Further, the encoder may further include at least one optical detection mechanism other than the first incremental detection mechanism and the second incremental detection mechanism. In such a case also, at least one detection mechanism having the curved slits will suffice.

Still further, in the embodiment, the description has been given of the case where the encoder 100 includes the position data calculator 140. On the other hand, the structure of the position data calculator 140 may entirely or partially be arranged in the controller CT.

In the present specification, the steps shown in the flowchart include, not to mention the processes performed in a time-oriented manner in order of the description, the processes performed in parallel or individually which are not necessarily be processed in a time-oriented manner. It goes without saying that even those steps processed in a time-oriented manner are subjected to change in their order depending on the situation.

What is claimed as new and is desired to be secured by Letters Patent of the United States is:

1. An encoder, comprising:
   a circular disk that is disposed rotatably about a rotary axis and that has a first track and a second track each being ring-shaped and provided with an optical rotary grating; and
   a first detector and a second detector that are fixedly disposed so as to respectively face the first track and the second track each provided with an optical fixed grating that structures a diffraction interference optical system in conjunction with the facing rotary grating of corresponding one of the first track and the second track to detect diffracted interfering light obtained by the rotary grating and the fixed grating, wherein
   the rotary grating of the first track includes a plurality of slits formed as curved slits each curved from a radial direction, and
   the first detector facing the first track is disposed so as to face the first track at a position where a tangent of each of the slits included in the rotary grating of the first track becomes parallel to a tangent of each of the slits included in the rotary grating of the second track at a position where the second detector faces the second track.

2. The encoder according to claim 1, wherein
   the plurality of curved slits are formed along curved lines obtained by a plurality of radial lines originating from the rotary axis in a circumferential direction with a prescribed curvature, such that a pitch of the plurality of curved slits assumes a prescribed value.

3. The encoder according to claim 1, wherein
   a pitch of the plurality of slits included in the rotary grating of the first track is identical to a pitch of the plurality of slits included in the rotary grating of the second track.

4. The encoder according to claim 3, wherein
   the slits of the rotary grating of the first track are different in number from the slits of the rotary grating of the second track, the encoder further comprising
   a position data generator that generates a rotary position of the disk based on a first detection signal obtained by the first detector and a second detection signal obtained by the second detector, the first detection signal and the second detection signal being different in periodicity per revolution of the disk.

5. The encoder according to claim 4, wherein
   the disk further includes a ring-shaped third track provided with a rotary grating including a plurality of concentric slits formed about the rotary axis,
   the encoder further includes a third detector that is fixedly disposed so as to face the third track and that is provided with an optical fixed grating that structures a diffraction interference optical system in conjunction with the facing rotary grating of the third track to detect diffracted interfering light obtained by the rotary grating and the fixed grating, and
   the third detector is disposed so as to face the third track at a position where a tangent of each of the slits included in the rotary grating of the third track becomes parallel to the tangent of each of the slits included in the rotary grating of the first track at a position where the first detector faces the first track.

6. The encoder according to claim 5, wherein
   the position data generator measures an error occurring in each of the first detection signal and the second detection signal based at least on a third detection signal obtained by the third detector, and corrects the generated rotary position of the disk based on the error.

7. The encoder according to claim 1, wherein
   the fixed grating of the first detector facing the first track is formed so as to be in parallel to the tangent of each of the curved slits.

8. The encoder according to claim 7, wherein
   a gap between the rotary grating of the first track and the fixed grating of the first detector facing the rotary grating of the first track is equal to a gap between the rotary grating of the second track and the fixed grating of the second detector facing the rotary grating of the second track.

9. A servo unit, comprising:
   a motor that rotates a shaft;
   an encoder that is coupled to the shaft to measure a position of the shaft; and
   a controller that controls rotation of the motor based on the position detected by the encoder, wherein
   the encoder includes
   a circular disk that is disposed about a rotary axis so as to be rotatable in accordance with rotation of the shaft and that has a first track and a second track each being ring-shaped and provided with an optical rotary grating, and
   a first detector and a second detector that are fixedly disposed so as to respectively face the first track and the second track each provided with an optical fixed grating that structures a diffraction interference optical system in conjunction with the facing rotary grating of corresponding one of the first track and the second track to detect diffracted interfering light obtained by the rotary grating and the fixed grating, wherein the rotary grating of the first track includes a plurality of slits formed as curved slits each curved from a radial direction, and the first detector facing the first track is disposed so as to face the first track at a position where a tangent of each of the slits included in the rotary grating of the first track becomes parallel to a tangent of each of the slits included in the rotary grating of the second track at a position where the second detector faces the second track.

10. An encoder manufacturing method, comprising:

determining number of a plurality of slits formed in a rotary grating formed for each of a ring-shaped first track and a ring-shaped second track provided to a circular disk disposed about a rotary axis so as to be rotatable when mounted on an encoder, such that a detection signal of a prescribed period is obtained based on the plurality of slits of each of the first track and the second track;

setting a plurality of radial lines originating from the rotary axis equiangularly for the first track as many as the number of the slits determined in the determining the number of a plurality of slits;

setting a plurality of curved lines by curving each of the plurality of radial lines in a circumferential direction with a prescribed curvature for the first track, such that a pitch of the plurality of slits assumes a prescribed value;

setting the plurality of slits of the first track along the plurality of curved lines; and fixedly disposing a first detector and a second detector so as to respectively face the first track and the second track, each of the first detector and the second detector being provided with an optical fixed grating that structures a diffraction interference optical system in conjunction with the rotary grating of corresponding one of the first track and the second track to detect diffracted interfering light obtained by the rotary grating and the fixed grating, wherein in the fixedly disposing the first detector and the second detector, the first detector is disposed so as to face the first track at a position where a tangent of each of the slits included in the rotary grating of the first track becomes parallel to a tangent of each of the slits included in the rotary grating of the second track at a position where the second detector faces the second track.

* * * * *